US009823968B1

(12) United States Patent
Fugini et al.

(10) Patent No.: US 9,823,968 B1
(45) Date of Patent: Nov. 21, 2017

(54) DATA STORAGE SYSTEM EMPLOYING A VARIABLE REDUNDANCY DISTRIBUTED RAID CONTROLLER WITH EMBEDDED RAID LOGIC AND METHOD FOR DATA MIGRATION BETWEEN HIGH-PERFORMANCE COMPUTING ARCHITECTURES AND DATA STORAGE DEVICES USING THE SAME

(71) Applicant: DATADIRECT NETWORKS, INC., Chatsworth, CA (US)

(72) Inventors: Thomas E. Fugini, Mt. Airy, MD (US); Michael J. Piszczek, Laurel, MD (US); William J Harker, Columbia, MD (US); Jason M. Cope, Highland, MD (US); Pavan Kumar Uppu, Woodbine, MD (US)

(73) Assignee: DataDirect Networks, Inc., Chatsworth, CA (US)

( * ) Notice: Subject to any disclaimer, the term of this patent is extended or adjusted under 35 U.S.C. 154(b) by 20 days.

(21) Appl. No.: 14/832,147

(22) Filed: Aug. 21, 2015

(51) Int. Cl.
*G06F 11/10* (2006.01)
*G06F 3/06* (2006.01)

(52) U.S. Cl.
CPC .......... *G06F 11/1076* (2013.01); *G06F 3/064* (2013.01); *G06F 3/0619* (2013.01); *G06F 3/0689* (2013.01)

(58) Field of Classification Search
CPC .... G06F 11/1076; G06F 3/0619; G06F 3/064; G06F 3/0689
See application file for complete search history.

(56) References Cited

U.S. PATENT DOCUMENTS

| 6,804,794 B1* | 10/2004 | Robidoux | G06F 11/073 |
| | | | 714/42 |
| 2005/0027891 A1* | 2/2005 | Emmot | G06F 13/4027 |
| | | | 709/253 |
| 2005/0028069 A1* | 2/2005 | Thayer | G06F 11/1076 |
| | | | 714/770 |
| 2005/0080958 A1* | 4/2005 | Handgen | G06F 13/4018 |
| | | | 710/100 |
| 2005/0097184 A1* | 5/2005 | Brown | G06F 13/4022 |
| | | | 709/213 |

(Continued)

OTHER PUBLICATIONS

J.S. Plank and Y. Ding, Note: Correction to the 1997 Tutorial on Reed-Solomon Coding, Technical Report UT-CS-03-504, Department of Computer Science, University of Tennessee, Apr. 24, 2003.

*Primary Examiner* — Kyle Vallecillo
(74) *Attorney, Agent, or Firm* — Rosenberg, Klein & Lee

(57) ABSTRACT

Variable Redundancy Distributed (VRD) RAID controller in a data storage environment contains embedded RAID logic permitting to choose and compute a desired redundancy coding scheme from a plurality thereof pre-programmed and embedded in a Compute Engine in the VRD RAID controller. "Write" or "Read" requests which are received from data generating entities, contain information identifying a type of the redundancy coding scheme of interest. The controller decodes the request, and automatically applies the desired computation to the incoming data without burdening the CPU with the computational activity. The variable redundancy computational ability of the subject systems provides an extremely versatile and flexible tool for RAID operations.

29 Claims, 10 Drawing Sheets

(56) References Cited

U.S. PATENT DOCUMENTS

| | | | |
|---|---|---|---|
| 2006/0236032 A1* | 10/2006 | Campbell | G06F 12/0866 711/118 |
| 2010/0037014 A1* | 2/2010 | Lim | G11C 7/22 711/105 |
| 2012/0117317 A1* | 5/2012 | Sheffler | G11C 7/22 711/103 |
| 2012/0131288 A1* | 5/2012 | Box | G06F 15/7867 711/154 |
| 2012/0246507 A1* | 9/2012 | Luo | G06F 11/1048 714/2 |

* cited by examiner $C_1$ encoding example for n+m = 8+2
Subsequent Channel Data Submission Step 4    Channel Equation Selection Step 5    Galois Multiplication, finite size = 4

Step 6    XOR for first data submission

Step 7    Repeat Steps 4-6 until all channels needed for the encoding $C_1$ have been processed

DATA STORAGE SYSTEM EMPLOYING A VARIABLE REDUNDANCY DISTRIBUTED RAID CONTROLLER WITH EMBEDDED RAID LOGIC AND METHOD FOR DATA MIGRATION BETWEEN HIGH-PERFORMANCE COMPUTING ARCHITECTURES AND DATA STORAGE DEVICES USING THE SAME

FIELD OF THE INVENTION

The present invention is directed to data storage systems for data migration between data generating entities, for example, high-performance computing cluster architectures, and data storage devices.

In particular, the present invention is directed to data storage systems employing RAID controllers distributed in the PCIe fabric, and containing embedded Variable Redundancy RAID logic permitting variable redundancy rather than (or in addition to) a fixed XOR parity scheme, which automatically performs a desired RAID operation on incoming data based upon the information embedded in the "write" and/or "read" request(s) received from a host which identifies a desired protection redundancy scheme or any other RAID operation from numerous choices pre-programmed in the RAID controllers.

In overall concept, the present invention is directed to a data storage system and method which eliminates the use of an expensive CPU (Central Processor Unit) or GPU (Graphics Processor Unit), and which moves the RAID compute capability from the CPU (and/or GPU) into a RAID controller, where transparent computer operations are applied to data flowing through the data storage system in which a Variable Redundancy Distributed (VRD) RAID controller automatically performs desired RAID compute operations identified in a PCIe address associated with a request received from a data generating entity.

The present invention is further directed to a data storage system in which the VRD RAID controller is integrated with RAID computing logic pre-configured with appropriate equations for RAID encoding and/or error detection, and recovery equations for error correction across a wide variety of redundancy coding schemes, where a desired RAID coding scheme is selected "on-the-fly" from a set of pre-programmed equations embedded in the VRD RAID controller in accordance with in-band parameters tied to data packets and Vandermonde matrix transformations and multiplication over Galois Fields embedded in the VRD RAID controller.

In addition, the present invention is directed to a data storage system compatible with miniaturized and power-saving FPGA (Field-Programmable Gate Array) technology which, when used in conjunction with broadcast capabilities of PCIe switches, permits the performance of RAID compute operations in a highly efficient manner, i.e., without need for read-in copies in the CPU for data modifications.

BACKGROUND OF THE INVENTION

Computer systems generally employ data storage devices, such as disk drive devices (or solid-state storage devices) for storage and retrieval of large amounts of data. The arrays of solid-state storage devices such as flash memory, phase change memory, memristors, or other non-volatile storage units, may also be used in data storage systems.

The most common type of a storage device array is the RAID (Redundant Array of Inexpensive (Independent) Drives). The main concept of the RAID is the ability to virtualize multiple drives (or other storage devices) in a single drive representation. A number of RAID schemes have evolved, each designed on the principles of aggregated storage space and data redundancy.

Many of the RAID schemes employ an error protection scheme commonly referred to as "parity" which is a widely used method in information technology to provide for tolerance in a given set of data. For example, in the RAID-5 data structure, data is striped across the hard drives, with a dedicated parity block for each stripe.

In the RAID-6 scheme, the block-level striping is performed with double distributed parity. This scheme tolerates up to two concurrent drive failures.

The parity blocks are computed by running the XOR comparison on each block of data in the stripe. The parity is responsible for the data fault tolerance. In operation, if one disk fails (or two disks for RAID-6 level) new drives can be put in place and the RAID controller can rebuild the data automatically using the parity data.

As hard disk sizes continually increase, the need for increased redundancy becomes more pressing. The CPU performance bottleneck has been a limiter in any move to increase RAID redundancies beyond RAID-6.

Current RAID engines generally use a CPU (or GPU) with a DMA (Direct Memory Access) capability attached to a large memory to perform XOR operations to generate parity. Typically, data to be striped across a set of drives is first written into the memory buffer of the CPU. The CPU then reads the data back in chunks (blocks) and calculates the XOR of the data to generate parity.

The parity XOR data is then written back to the memory, and subsequently is "flashed" to the storage disks. This method requires all of the data to be buffered in the memory of the CPU. The conventional centralized CPU scheme potentially may experience a bottleneck in data migration through the data storage system.

Referring to FIG. 1 which represents a typical RAID engine using a centralized CPU for computational operations, when a host 10 sends a "write" data request to storage devices 12, the data is first written to a memory 14 attached to the CPU 16. In this arrangement, the data is sent to a PCIe switch 18 that forwards it to the CPU 16 which in turn passes the data into the memory 14. A memory controller 20 within the CPU 16 controls data writing to and reading from the memory 14.

The CPU 16 reads the data from the memory 14, performs an XOR of the data, and then writes the data back into the memory 14. The CPU 16 then instructs the storage devices 12 to read the data and parity from the memory 14 and saves the data internally.

In this arrangement, all of the data is buffered in the memory 14, thus requiring an overly fast transfer rate of the data in the Memory Interface. This scheme requires the Memory Interface to the CPU to be 3× (+2× for parity) faster than the transfer array of data.

In addition, the reliance of the XOR (or any other requested Boolean logical or arithmetic) operation in this arrangement on an expensive CPU (and/or GPU), as well as the need for an additional software to be written for the CPU (and GPU) operation, results in a complex and expensive scheme, which also has a large footprint and elevated needs for cooling and power consumption.

It is therefore desirable to provide a data storage system which may perform computations in an efficient, inexpensive, and simple manner without reliance of the compute operation or buffering data in the CPU (or GPU), and which moves the RAID computations out of the CPU (or GPU), by-passing the central performance bottleneck, and eliminating the need to read in copies of the data into the CPU to make changes to the data, which typically requires multiple "hops" to and from the memory. In addition, a design is needed which can be scaled beyond RAID-6, for example to triple redundancy and beyond, at only a minor cost increase and without sacrificing the throughput.

SUMMARY OF THE INVENTION

It is therefore an object of the present invention to provide a data storage system which encompasses numerous data protection schemes supporting RAID-5, RAID-6, and beyond, and where a Variable Redundancy Distributed (VRD) RAID Controller is deployed in either a disk oriented or a declustered RAID scheme, to perform recursive on-the-fly XOR calculations for required encoding schemes on incoming data with no added time for "write" operations.

It is another object of the present invention to provide a data storage system employing distributed RAID controllers capable of variable redundancy computations rather than (or in addition to) a fixed XOR parity scheme, where each RAID controller contains an n+m RAID engine which is configured to provide data protection which tolerates any quantity of disk (or data objects) failures for a chunk of data encoded across numerous drives.

It is a further object of the present invention to provide a data storage system capable of RAID computations performed in an efficient and inexpensive way without reliance on buffering data in CPU (or GPU) in a centralized fashion, where by distributing a number of low cost RAID Controllers throughout the storage network, a central point of failure is eliminated.

It is an additional object of the present invention to provide a data storage system employing a VRD RAID controller with embedded RAID logic for operations applied to incoming data (and/or the contents of an external local memory), where the VRD RAID controller is integrated with an FPGA (Field-Programmable Gate Array) which results in lower operating costs, lower power consumption, less cooling requirements and a smaller footprint.

Also, it is an object of the present invention to provide a data storage system using a VRD RAID controller incorporating a Compute Engine integrated with FPGA technology which permits the implementation of numerous encoding and recovery equations to match the appropriate information dispersal matrix for any pre-determined Reed-Solomon redundancy scheme coding. The FPGA based VRD RAID controller implements the encoding and recovery equations utilizing Galois Multiplication Lookup tables and XOR logic integrated with a PCIe interface and a memory controller interface.

It is another object of the present invention to provide a data storage system which employs a VRD RAID controller embedded with the RAID encoding, error detection, and error correction across a wide variety of redundancy coding schemes, which are selected on-the-fly from a set of pre-programmed options embedded in the VRD RAID Controller's Compute Engine based on the information acquired by the VRD RAID controller from incoming "write" or "read" requests for automatic execution of desired logical operations.

In overall concept, the subject invention is contemplated as a data storage system employing Variable Redundancy Distributed (VRD) RAID controller(s), each containing a plurality of n+m RAID engines, where the variable "n" refers to the number of data storage disks (or data objects), while the variable "m" refers to the number of error correction coding storage disks (or objects). In the subject system, data protection is provided in a variable redundancy manner, i.e., the system in question operates to tolerate any quantity "m" of disks (or data objects) failures for a "chunk" of data encoded across n+m drives (or objects), for example, for the RAID-6 protection level, where m=2. The subject system is capable of encompassing data protection schemes with m greater than or equal to 1, supporting RAID-5, RAID-6, and beyond the RAID-6 for m≥2, for example, triple redundancy protection, and beyond.

The Variable Redundancy Distributed (VRD) RAID Controller employed in the subject data storage system can be deployed in either a disk oriented or a declustered RAID scheme. The VRD RAID Controller is configured to perform recursive XOR based calculations for each of m encoding. These operations are performed "on-the-fly" on incoming data with no added time for "write" operations.

Error checking during read operations occurs in a similar fashion, as does the error detection, and recovery.

The advantages of the subject configuration are at least two-fold:

(a) the RAID computations are removed from the CPU, thus bypassing a central performance bottleneck, with the need to read in copies of the data into the CPU to make changes to the data being eliminated which otherwise requires multiple "hops" to and from the central memory; and as hard disk sizes continually increase, the need for increased redundancy becomes more pressing. The CPU performance bottleneck has been a limiter in any move to increased RAID redundancies beyond RAID-6 (such as, for example, for the triple redundant coding 8+3). The subject system can be scaled to triple redundancy and beyond at only a relatively minor cost increase without sacrificing throughput; and (b) by distributing numerous low cost RAID Controllers throughout the storage network, a central point of failure can be eliminated.

The subject VRD RAID controller may be integrated within an FPGA (Field Programmable Gate Array), leveraging their logic density, flexibility, and cost effectiveness. FPGA technology permits the implementation of all encoding and recovery equations to match the appropriate information dispersal matrix for any pre-determined Reed-Solomon redundancy scheme coding.

The FPGA in the subject system is configured to implement the equations utilizing Galois Multiplication Lookup tables and XOR logic. This function is integrated in the FPGA with a PCIe Interface and a Memory Controller Interface. The Memory Interface allows the subject controller to locally store calculated data or encodings prior to commitment to the disks or the hosts.

Various RAID coding schemes are implemented in the FPGA based Compute Engine by utilizing industry recognized Reed Solomon encoding. The flexible nature of the FPGA allows it to be pre-programmed with appropriate equations for RAID encoding, error detection, and recovery equations for error correction across a wide variety of n+m combinations.

A desired n+m scheme is selected on-the-fly from a set of pre-programmed equations as dictated by in-band parameters tied to the data packets (requests) from hosts. The equations are initially created by generating an (n+m)×n Vandermonde matrix for each desired n+m scheme. Through matrix transformations and multiplication over Galois Fields, an appropriate information dispersal matrix is created. Based on the information determined by the dispersal matrix, all necessary RAID equations are generated for programming and are embedded into the FPGA based Compute Engine.

Any addition or subtraction in these equations can be performed by simple XOR operations achieved at negligible cost and time within the FPGA. Multiplication and division operations are slightly more involved, but also can be achieved through multiplication over $2^w$ Galois Fields. By keeping the finite size "w" below a predetermined value, the multiplication remains fairly simple with the restriction that $n+m<2^w$.

For example, a finite size of w=4 is easily and optimally realized in the FPGA based Compute Engine limiting n+m to 16. However, larger sizes for "w" are also contemplated in the present system.

For a given finite size "w", a Galois Multiplication Look-Up-Table is created. By using an appropriate logarithmic table for Galois Fields ($2^w$), a Look-Up-Table (LUT) is completed for every possible multiplication combination covering numerous redundancy protection schemes. The requisite LUT for the given finite size "w" is then programmed into the FPGA-based Compute Engine.

This approach allows the VRD RAID Controller to quickly and inexpensively perform every necessary RAID calculation using simple XOR and Look-Up-Table operations based upon the n+m RAID redundancy scheme desired.

When the subject VRD RAID controller is used in conjunction with the broadcast capabilities of PCIe switches, transparent RAID computations upon data are attained as data flows in and out of the data storage. This permits RAID computations of variable redundancy to be removed from the potential bottleneck of a conventional centralized CPU.

These computations are automatically performed by the subject VRD RAID controller based upon the PCIe address associated with the requested "write" or "read" operation. The current VRD RAID controller addresses its attached external memory via its PCIe interface to perform conventional "writes" and "reads" to/from the external memory. It will also automatically decode an extended address field appended to the PCIe address of a memory operation. Based upon the decoded contents of this field, the subject controller will determine the necessary parameters for the desired RAID operation.

In one aspect, the present invention represents a data storage system which comprises Variable Redundancy Distributed (VRD) RAID controller(s) containing embedded computational functionality for various RAID encoding schemes, as well as error detection and error correction across a broad range of different combinations of data objects (or disks) and error correction coding objects (or disks). The VRD RAID controller supports an attached external Memory Unit which is addressable via a Memory Interface.

The subject VRD RAID controller is deployed in a high speed PCIe network comprised of data generating entities (also referred to herein as hosts), data storage, and a PCIe switch (or switches).

The external memory supported by the VRD RAID controller includes, but is not limited to, various DDR (Double Data Rate), such as DRAM (Dynamic Random-Access Memory), SRAM (Static Random-Access Memory), flash memory, etc.

The compute operations may be applied to incoming data (and/or the contents of the external Memory). The compute operations are automatically performed by the VRD RAID controller(s) based upon a PCIe address associated with the requested operation. The subject VRD RAID controller performs conventional "writes" and "reads" on the external memory through the PCIe interface. It also automatically decodes an extended address (Control bits) field contained in the PCIe address received from hosts which is appended to the addressable range of the external Memory Units.

The subject RAID encoding principles are applicable to the incoming PCIe data, and to the data contained in the external memory at the address specified in the PCIe "write" request as needed. Based upon the decoded contents of the Control bits field of the received PCIe address, the VRD RAID controller performs a desired RAID encoding, and/or error detection scheme, as well as error correction operation on the incoming PCIe data, and is capable of performing the required coding operation on a data object read from the external memory at the specified address.

The VRD RAID controller further includes a PCIe interface, a Memory Interface with an attached ECC generator and checker, and multiple Controller Blocks connected to a Write Data Multiplexer (MUX). Preferably a Read Data Multiplexer (MUX) connects outputs of both the Memory Interface and the Write Data Multiplexer to the PCIe interface.

The VRD RAID controller is equipped with an Address Decode and Control Block (also referred to herein as Unit) residing within each Controller Block. One of the functions performed by the Address Decode and Control Unit is to determine both the physical memory address and the desired redundancy scheme coding operation, i.e., n+m RAID scheme, based upon the incoming PCIe address.

The VRD RAID controller may be integrated with an FPGA (Field Programmable Gate Array) technology which facilitates the implementation of a full range of encoding and recovery equations to match the appropriate information dispersal nature for any pre-determined Reed-Solomon redundancy scheme coding.

The number of bits in the Control bits field of the request required depends upon the available redundancy operation desired. The flexible nature of the FPGA technology allows for the range of the Control bits field in the received PCIe address to be variable for the purpose of the subject system. The summation of two bit fields (x bits in the Physical Address field and n control bits in the Control bits field) is presented to the PCIe bus in the format of a virtual address range.

In addition to the Address Decode and Control Block, each Controller Block includes an Input Data Buffer, a Read Back Data Buffer, and a Compute Engine adapted for operations which include but are not limited to RAID coding related computations, computations related to error detection, data recovery routines, and other desired operations, automatically performed in accordance with the information identified in the virtual address range and decoded by the Address Decode and Control Unit.

The Compute Engine preferably includes a Channel Equation Selection Unit coupled to an output of the Address Decode and Control Block, the Galois Multiply (LUT) coupled by its inputs to the Channel Equation and Selection Unit and the Input Data Buffer, and an XOR engine coupled by its inputs to the output of the Galois multiply LUT and the Read Back Data Buffer.

Upon receiving a PCIe "write" request, the incoming PCIe "write" data is placed into the Input Buffer. The Address Decode and Control Block also decodes the desired RAID scheme coding from the Control bits field of the requested PCIe address. It commands the Compute Engine to perform the desired operation on the data written in the Read Back Buffer and Input Buffer, and then instructs the Memory Interface to transmit the computational result to the external Memory as it flows from the Compute Engine.

Specifically, the Address Decode and Control Block decodes the information in the virtual address range of the request, and provides the decoded parameters to the Channel Equation Selection Unit, which, in turn, subsequently provides an appropriate multiplication constant to the Galois Multiply LUT for the selected n+m redundancy scheme, channel encoding to be generated, and channel(s)/encoding(s) missing.

The Galois Multiply LUT then provides a predetermined output value to the XOR engine based on two input values, one received from the Input Data Buffer and another supplied by the Channel Equation Selection Unit.

For the first block of data submitted to the Input Data Buffer for a given RAID encoding, the XOR block will XOR all data from the Galois Multiply LUT with zero. The output data of the XOR Engine will flow through the Read Back Mux into the Read Back Data Buffer, which is preferably matched in size to the Input Data Buffer.

On subsequent PCIe "write" transfers within a given RAID encoding, the XOR Engine performs operations between constants generated by the Galois Multiply LUT and data written in the Read Back Data Buffer. The contents of the Read Back Data Buffer are recursively overwritten during each incremental step of a given RAID calculation for each subsequent XOR-ing.

A bit is provided within the virtual address range which indicates the last PCIe write for a given RAID calculation. This bit is decoded by the Address Decode and Control Block, and after the final PCIe "write" request for a given RAID encoding is processed, the updated contents of the Read Back Data Buffer will be committed to the External Memory.

The Control Block requests access to External Memory through a Memory Arbiter. Upon acquiring access, the final parity result from the Read Back Data Buffer is written to the designated external memory address using the Write Data Mux, Address/Control Mux, and the Memory Interface.

In the subject system, data can be moved from the External Memory Unit to the Data Storage or to the Host(s) through PCIe "reads". The "read" data flows through the Memory Interface, ECC Check, Read Mux, to the PCIe Interface. Alternatively, data may be moved to these locations by a DMA (Direct Memory Access) Controller embedded in the PCIe Interface.

The Memory Interface can be intercoupled between the Controller Block(s) and the external Memory Unit to transfer data at exactly the PCIe data transfer rate. Recursive calculations within the FPGA allow the compute operation to be performed with minimal accesses to the Memory Unit. This alleviates the need for a faster and more costly external memory configuration, while maintaining transparency with no penalty or overhead in the system transfer time. As data flows to and from the external Memory, it is protected by an ECC (Error Checking and Correction Code) Generator and ECC Checker.

A plurality of the Controller Blocks are preferred in the subject VRD RAID Controller in order to simultaneously handle multiple PCIe operations.

Upon receiving a PCIe "read" request, the Memory Interface in the VRD RAID controller reads data from the external Memory Unit, as specified in the PCIe address, and passes it to the Read Back Data Buffer. The Address Decode and Control Block decodes the type of the desired redundancy coding from the control bits contained in the PCIe address. It subsequently commands the Compute Engine to initiate the desired coding scheme on the data written in the Read Back Data Buffer. The Read Data Multiplexer provides for these operations to be performed on-the-fly during the PCIe "read".

Data originating in the external Memory Unit will flow through the Read Back Data Buffer and the Compute Engine before passing through the Write Data Multiplexer and the Read Data Multiplexer to the PCIe Interface. The PCIe "read" transaction may be completed without interruption or time penalty.

Upon completion of the "read" request operation, the resulting data is transferred to the PCIe Interface for presentation onto the PCIe bus. This allows the final result of a single computation or recursive computations to be passed to the data storage via the PCIe bus.

Upon receiving a PCIe "write" request, the Address Decode and Control block indicates to the Channel Equation Selection block which RAID computation is to be performed based upon the parameters obtained from the virtual address range incorporated in the "write" request. Subsequently, the Channel Equation Selection block provides the appropriate constant for multiplication with the incoming data to the Galois Multiply LUT block. The output of the Galois Multiply LUT block is fed to the XOR Engine for an Exclusive-OR operation with the data previously written in the Read Back Data Buffer. As the preceding data is emptied from the Read Back Data Buffer, the subsequent XOR result is written back into the Read Back Data buffer in FIFO order. At the conclusion of a PCIe "write" transaction, the preceding buffer contents are recursively XOR-ed with the Galois Multiplication result for the incoming PCIe "write" data.

The recursive nature of the XOR operations allows the desired RAID computation to be accumulated in the Read Back Data Buffer as data flows across the PCIe fabric.

To isolate the failed channel(s) and/or encoding(s) in this case, the Host may simultaneously utilize multiple controller blocks to perform the recovery equations for each channel and encoding. In the case of a failed channel(s) or encoding(s), none of the recovery equations will generate a result matching that read from Data Storage. For the channel(s) or encoding(s) which have not failed, only equations excluding the failed channel(s) or encoding(s) will generate results matching that read from Data Storage.

Once the failed channel(s) or encoding(s) is determined, the Host uses the appropriate recovery equations to recreate the missing data. Since the data regeneration can occur simultaneously across multiple VRD RAID Controllers, the rebuild can be performed more quickly than with a conventional central CPU.

By performing intermediate calculations within the FPGA, the bandwidth requirements for the external memory interface are greatly reduced. This allows for both a lower cost FPGA and memory device. It is also contemplated that multiple Controller Blocks within each VRD RAID Controller can perform operations simultaneously while sharing the external memory through the Memory Arbiter.

For the error detection, the encodings generated during "read" from Data Storage would be compared by the Host to those previously committed to Data Storage. In the event of a mismatch of a given encoding between writing and reading Data Storage, an error is detected by the Host. Upon detection of an error, the Host uses the recovery equations embedded within the VRD RAID Controller(s) to isolate the failed channel(s) and/or encoding(s).

Each channel and encoding scheme has a set of predetermined recovery equations programmed into the FPGA, each with a total of n Galois multiplication terms. For a given channel or encoding scheme, each recovery equation would exclude (m−1) channels or encodings.

The subject system employs one or a number of PCIe switches coupled between the host(s) and the VRD RAID controller. The PCIe switch may be configured as a transparent bridge to forward the "write" or "read" requests from the host(s), along with the PCIe address, to the VRD RAID controller for further processing.

The data storage may be built as an array of storage devices, including disk drives or solid-state memory devices, such as, for example, flash memory, phase change memory, memristors, and other non-volatile storage devices.

The VRD RAID controller may be placed at different locations in the Storage Network. For example, alternatively to placing the subject controller in connection with the PCIe switch, the VRD RAID controller in question may be integrated with each of the data storage devices in the storage array, or with the hosts for pushing data from a host bus adapter.

The present system additionally constitutes a method for data migration which is carried out through the steps of:

embedding a plurality of Controller Blocks into on RAID Memory Controller, where each Controller Block includes a first Buffer, a second Buffer, and a Compute Engine coupled (by inputs thereof) to the first and second Buffers, and coupling each of the plurality of Controller Blocks between at least one host and an external Memory Unit.

The method continues with receiving, from a host, a "write" and/or "read" request and a PCIe address associated with the requested operation. The PCIe address includes a Physical Address bits field and a Control bits field. The Physical Address bits field corresponds to the address of data of interest in the external Memory Unit, while the Control bits field identifies a desired RAID coding scheme for the request in question, as well as an encoding to be generated which corresponds to the desired RAID coding scheme, and a channel for the data submitted.

An Address Decode and Control Block (also referred to herein as the "Unit") is included in each Controller Block. In the subject method, the Address Decode and Control Unit operates to analyze the Control bits field in the PCIe address to determine what type of a redundancy coding scheme is to be performed. Subsequently, the Address Decode and Control Unit generates a corresponding control signal for submission to the Compute Engine.

The Compute Engine is pre-programmed with numerous encoding and recovery equations to match the appropriate information dispersal matrix for any pre-determined Reed-Solomon redundancy scheme coding. The VRD RAID Controller is capable of implementing the equations utilizing Galois Multiplication Lookup Tables and XOR logic embedded in the Compute Engine.

Various RAID schemes can be implemented by the subject VRD RAID controller which is pre-programmed with the appropriate equations for RAID encoding error detection and error correction across a wide range of RAID coding schemes.

Upon receiving a PCIe "write" request from a host (or hosts), and decoding (by the Address Decode and Control Unit) an address of a data block in the external Memory Unit and a desired computational operation, the method proceeds with the following operations:

Instructing, by the Address Decode and Control Unit, the Channel Equation Selection Unit which RAID coding computation is to be performed based upon the parameters decoded from the virtual address range incorporated in the "write" request.

Subsequently, the Channel Equation Selection Unit generates an appropriate constant for multiplication with the incoming data to the Galois Multiply LUT block. The Galois Multiply LUT block, responsive to receipt of the constant for multiplication, generates an output which is fed to the XOR Engine for an Exclusive-OR operation with the data previously held in the Read Back Data Buffer.

As preceding data is emptied from the Read Back Data Buffer, the next XOR result is written back into the Read Back Data buffer in FIFO order. At the conclusion of a PCIe "write" transaction, the previous contents of the Read Back Data Buffer are recursively XOR-ed with the Galois Multiplication result of the incoming PCIe "write" data.

To isolate the failed channel(s) and/or encoding(s) in this case, the Host simultaneously utilizes multiple Controller Blocks to perform the recovery equations for each channel and encoding. In the case of a failed channel(s) or encoding(s), none of the recovery equations will generate a result matching that read from Data Storage. For the channel(s) or encoding(s) which have not failed, only equations excluding the failed channel(s) or encoding(s) will generate results matching that read from Data Storage.

Once the failed channel(s) or encoding(s) is determined, the Host uses the appropriate recovery equations to recreate the missing data. Since the data regeneration can occur simultaneously across multiple VRD RAID Controllers, the rebuild can be performed more quickly than with a conventional central CPU.

For the error detection, the method continues with the operation of comparing the encodings generated during "read" from Data Storage with those previously committed to Data Storage. In the event of a mismatch of a given encoding between writing and reading Data Storage, an error is detected by the Host. Upon detection of an error, the Host uses the recovery equations embedded within the VRD RAID Controller(s) to isolate the failed channel(s) and/or encoding(s).

Each channel and encoding scheme has a set of predetermined recovery equations programmed into the FPGA, each with a total of n Galois multiplication terms. For a given channel or encoding scheme, each recovery equation would exclude (m−1) channels or encodings.

In the subject method, for the first block of data submitted to the Input Data Buffer for a given RAID calculation, the XOR block applies XOR computations to all data received from the Galois Multiply LUT with zero. The output data of the XOR Engine will flow through the Read Back Mux into the Read Back Data Buffer.

On subsequent PCIe "write" transfers within a given RAID calculation, the method continues with XOR operations performed between constants generated by the Galois Multiply LUT and data written in the Read Back Data Buffer for the preceding XOR operations. The contents of the Read Back Data Buffer are recursively overwritten during each incremental step of a given RAID calculation.

After the final PCIe "write" request for a given RAID calculation, the method continues with committing the updated contents of the Read Back Data Buffer to the External Memory.

Additional error protection is provided in the subject method through the steps of:

applying ECC (Error Checking and Correction) procedures to the computational results transferred from the Controller Blocks to the External Memory Unit, and to the data migrating from the external Memory Unit to the data storage.

These and other objects and advantages of the present system and method will be readily seen upon reading the following detailed description of the preferred embodiment in conjunction with the drawings figures.

DETAILED DESCRIPTION OF THE INVENTION

Figure 1:
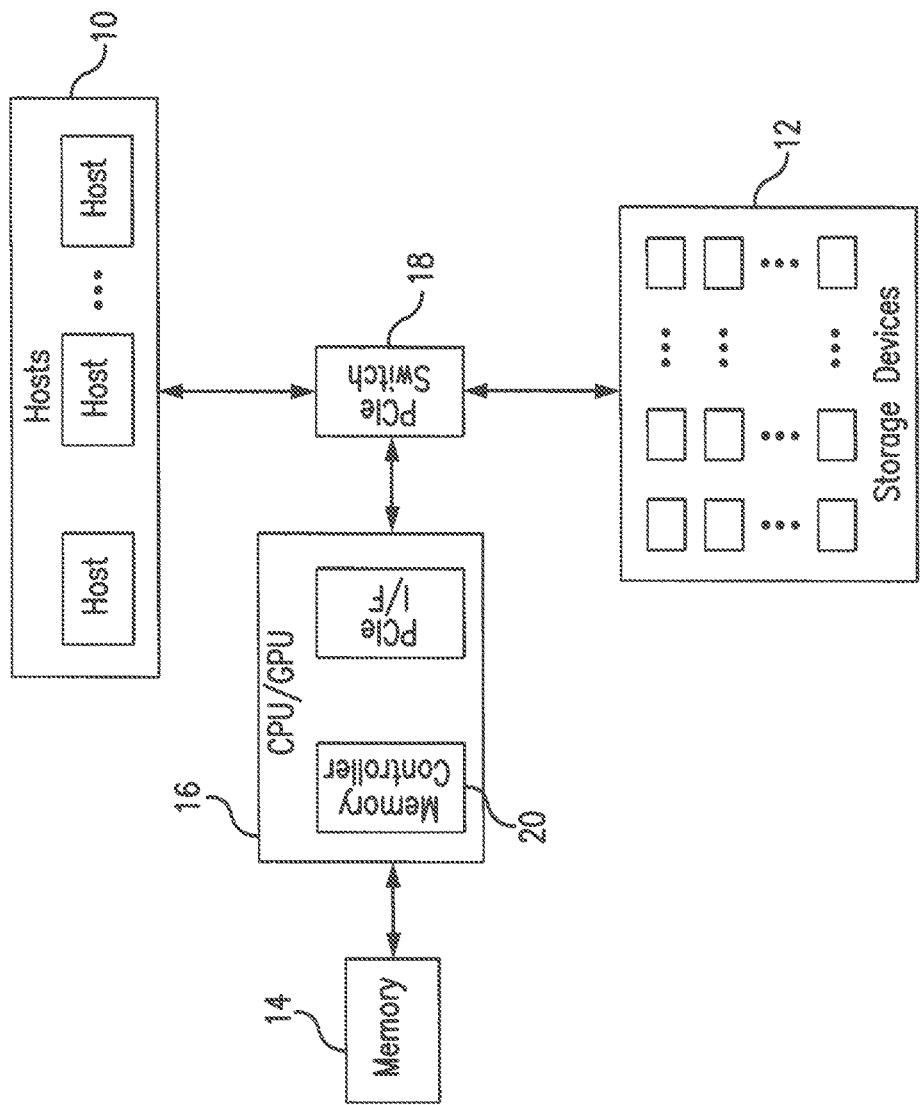
FIG. 1 is a schematic representation of the data storage system of the prior art.

Referring to FIGS. 2A-2B and 4A-4C, the system 30 of the present invention provides data storage for hosts (data generating entities) 32 in a data storage array 34 of data storage devices 36. Computer clusters, groups of linked computers, as well as single computers, involved in extended computations, may be linked by a high-speed network that permits sharing of computer resources and memory. Any computer within the computer clusters, as well as groups of linked computers, may serve as hosts. Data transfers to and from the computers may be performed through a high-speed PCIe switch bus 38.

The operation of computer clusters, as well as single computers (i.e., the hosts) requires data writing to and reading from the storage devices. The process of data transfer is carried out during the I/O cycle of the computers. The size of computer clusters and the aggregate I/O bandwidths that are to be supported may require thousands of data storage devices for servicing the computing architecture.

The system 30 is a data storage system employing a Variable Redundancy Distributed RAID controller 40 (further referred to herein also as VRD RAID controller) containing embedded logic configured for RAID coding operations applied to incoming data (when requested), as well as RAID computations for data already recorded in an external Memory Unit 44 or the data storage array 34.

The subject system 30 is configured to add variable redundancy rather than (or in addition to) a fixed XOR parity scheme. The variable redundancy ability is added to a controller 40 that is distributed in the PCIe fabric. It has the ability to automatically apply various redundancy schemes to data as it flows across the PCIe fabric to storage elements 36 and is simultaneously broadcast to the VRD RAID controller(s) 40.

As will be detailed in further paragraphs, the desired redundancy scheme is communicated uniquely for each data transfer through fields within an extended PCIe address range tied to each packet of data. The technique of accumulating the desired calculation in the Read Back Data Buffer over multiple PCIe transfers employed in the subject system allows the RAID calculation to be performed in parallel and transparently with no time penalty.

Additionally, the subject system is easily scalable as it is distributed in the PCIe fabric. Both storage and the number of VRD Raid controllers can be increased to meet the overall needs of an application.

The logic embedded in the VRD RAID controller 40 is configured as an n+m RAID engine (also referred to herein as a Compute Engine) 42. The "n+m" identifies a redundancy protection scheme computed by the Compute Engine 42, where the variable "n" refers to the number of data storage disks (or data objects, and the variable "m" refers to the number of error correction coding storage disks (or objects).

In other words, in the subject system 30, the data protection scheme is a variable entity and can be provided to tolerate any quantity "m" of disks (or data) failures for a "chunk" of data encoded across "n+m" drives (or objects). For example, for the RAID-6 level of redundancy, m=2. Protection coding for m≥2, and any number "n" is also contemplated in the subject system.

In overall concept, the present system is configured to encompass numerous data protection schemes where the number of error correction coding objects is greater than or equal to 1, supporting RAID-5, RAID-6, and beyond, and where a Variable Redundancy Distributed (VRD) RAID Controller is deployed in either a disk oriented or a declustered RAID scheme to perform recursive on-the-fly XOR based computations for numerous encoding schemes on incoming data with no added time for extra "write" operations.

The virtualized Compute Engine 42 included in the subject VRD RAID controller 40, is configured to perform, among its numerous functions, a desired redundancy coding operation to the data ingress from a data generating entity prior to "writing" the data in the data storage devices 36 or to the data "read" from the data storage devices 36.

Although the present invention is applicable to any type of the data storage and migrating system, as an example, but not to limit the scope of the invention to this particular embodiment, the data storage system may be based on RAID (Redundant Array of Independent Disks) data migration principles in which the controller 40 automatically performs XOR operations on incoming data. RAID systems use arrays of independent storage devices and employ a combination of mirroring and/or striping techniques for providing protection against lost data. For example, in some modifications of the RAID systems, data is interleaved in stripe units distributed with parity information across all of the storage devices (disk drives or solid-state memories).

A parity scheme in the RAID systems utilizes a two-dimensional XOR algorithm. Parity blocks are usually computed by using logical comparison called XOR (Exclusive OR) on binary blocks of data. An XOR comparison takes two binary bits, represented as 0 and 1, compares them and outputs an XOR result of "0" or "1". The XOR engine returns a "1" only if the two inputs are different if both bits are the same, i.e. both zeros or both ones, the output of the XOR range would be 0.

The parity blocks are computed by running the XOR comparison on each block of data in the stripe. This means that the first two blocks are XOR-ed, then the result is XOR-ed again. The third block, and the XOR comparison continues for all drives in the array, except for the block where the parity is stored.

In operation, the virtualized Compute Engine 42 is configured as the RAID engine to apply RAID calculations to data ingress from a data generating entity prior to "writing" the data in the storage devices 34.

Figure 2A:
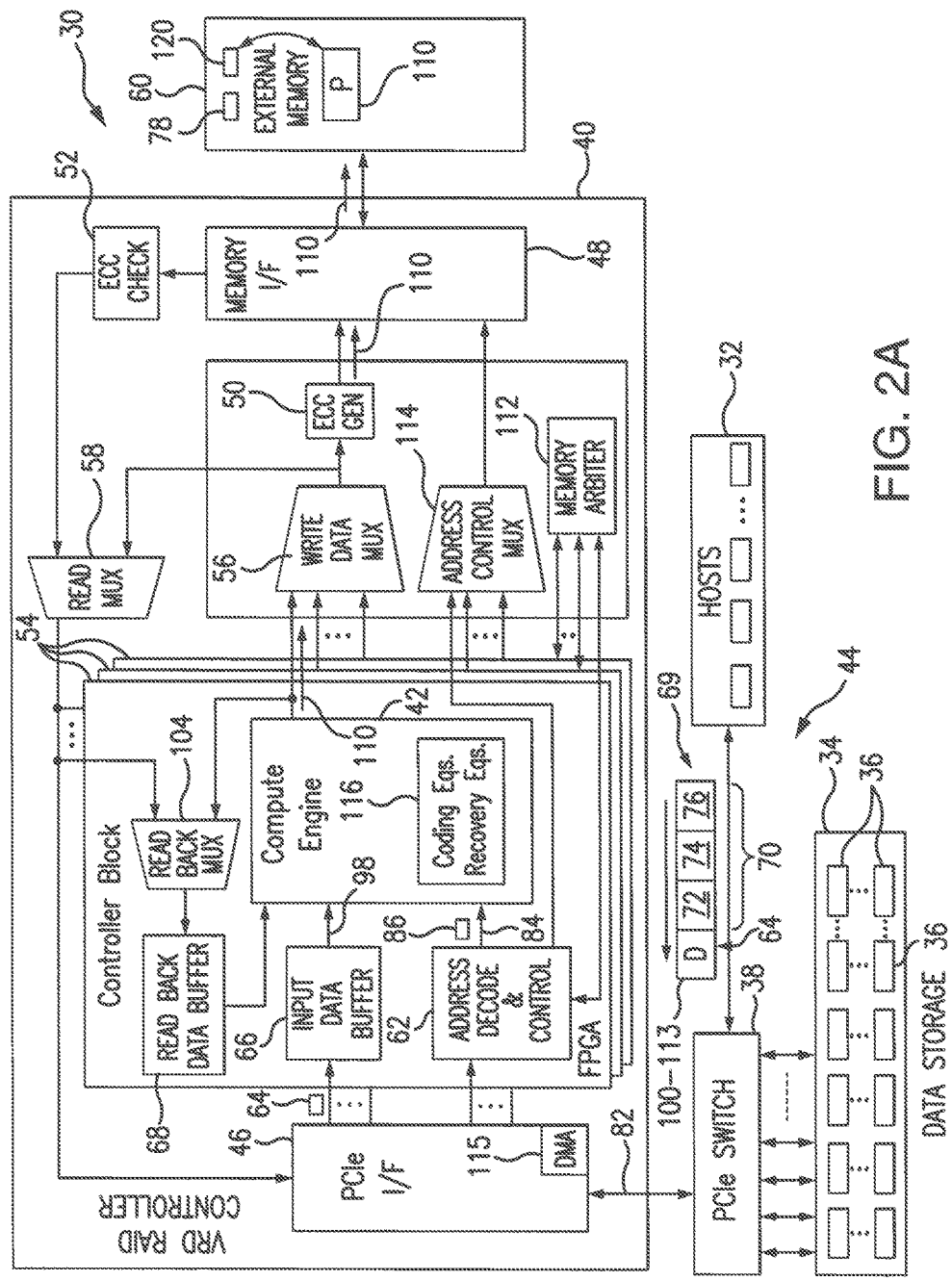
FIG. 2A is a schematic representation of the subject data storage system using the Variable Redundancy Distributed (VRD) RAID controller with embedded variable RAID encoding capability.
Figure 2B:
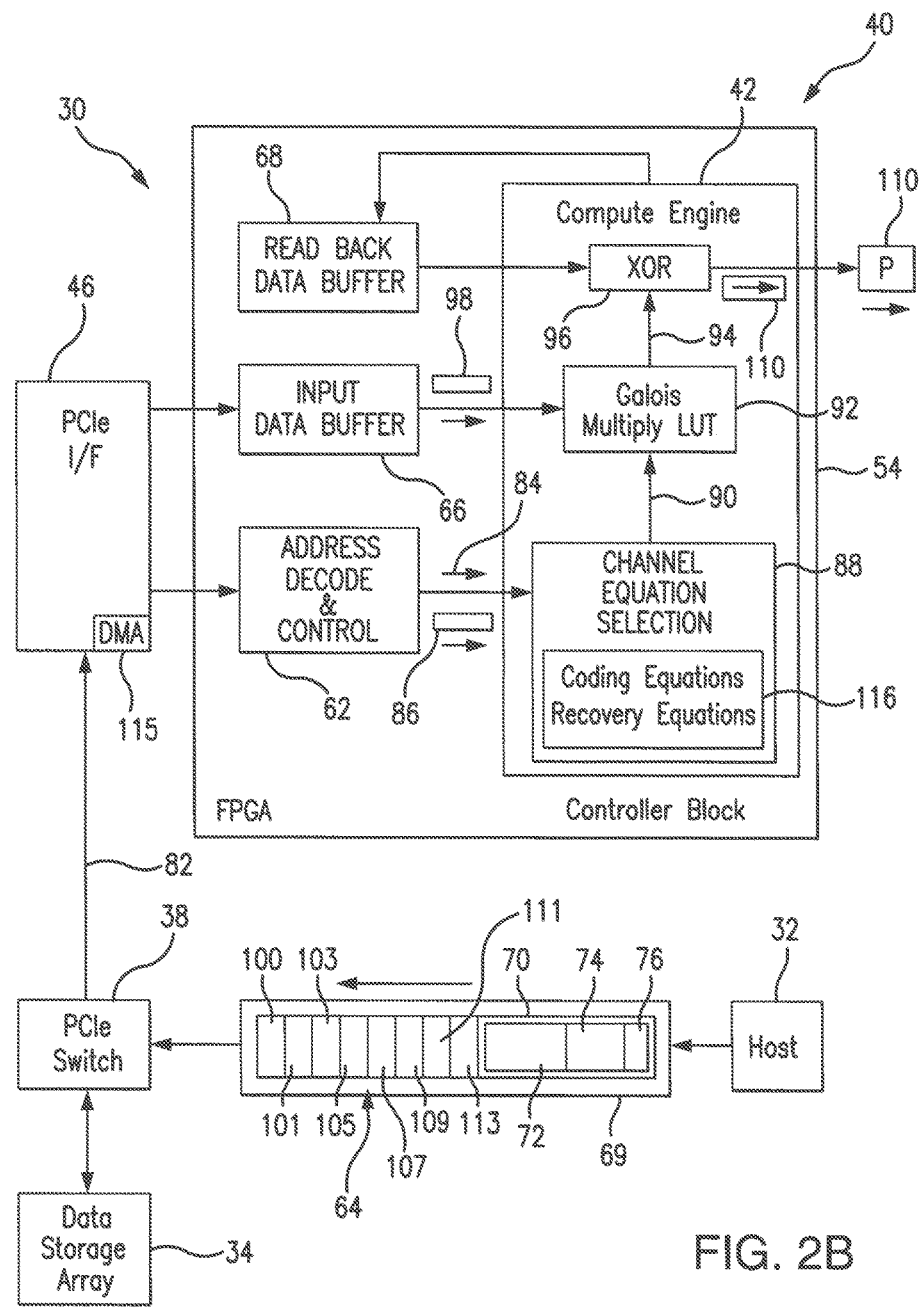
FIG. 2B is a detailed schematic representation of the subject Compute Engine configuration.

As shown in FIGS. 2A-2B, the subject VRD RAID controller 40 is deployed in the high speed PCIe network 44 comprised of the hosts 32, data storage 34, and the PCIe switch or switches 38.

The VRD RAID controller 40 is further configured, in addition to the Compute Engine 42, with a PCIe Interface 46, a Memory Interface 48 with an attached ECC (Error Correction Code) Generator 50, and an ECC Checker 52.

Preferably, the VRD RAID controller 40 includes multiple Controller Blocks 54 which are connected to a Write Data Multiplexer 56.

A Read Data Multiplexer 58 connects both the Memory Interface 48 and Write Data Multiplexer 56 to the PCIe Interface 46.

Each of the Controller Blocks 54 may be integrated with an FPGA for further improving the performance characteristics, costs and power consumption, as well as the scale of miniaturization of the present system. The FPGA technology is capable of providing the implementation of the full range of RAID logic integrated with the PCIe Interface 46 and the Memory Interface 48, which permits the subject controller 40 to perform requested operations between incoming data flowing across the storage network and data contained in the external memory.

The subject VRD RAID controller 40 is adapted to control the flow of data to and from the attached Memory Unit 60. The Memory Unit 60 may be of any type, including, but not limited to, DDR (Double Data Rate), Static Random Access Memory (SRAM), Flash memory, etc. For example, when adapted for DDR memory, the controller 40 permits twice the data to be transferred without increasing the memory clock rate.

When operating as a SRAM memory controller, the subject system attains an improved SRAM bandwidth (due to the use of inverters for driving bit lines), higher speed of operations (due to the simultaneous acceptance of all address bits), and easily detectable small voltage swings (due to differential signaling permitted by the symmetric structure of SRAMS).

Flash memory also may be used as a part of the DRAM (Dynamic Random Access Memory) unit. Although operating somewhat slower than the conventional DRAM, the operation with the Flash memory uses less power and is significantly cheaper in operating costs.

At least one (but preferably each) Controller Block 54 is equipped with an Address Decode and Control Unit 62 embedded in (or operatively coupled to) the Controller Block 54. The Address Decode and Control Block 62 is configured to determine both the physical memory address and a desired RAID coding operation, if requested by the host, based upon the incoming PCIe address (as will be detailed in the following paragraphs).

Each of the multiple copies of the Controller Blocks 54 is a logic function unit which includes the Input Buffer 66, the Read Back Buffer 68, and the Compute Engine 42. The Compute Engine applies requested computation(s) to the data contained in buffers 66 and 68, or in one of the buffers, as required by the requested RAID computational operation, and the results of the computation are transferred either to the external Memory Unit 60 or to the Data Storage 34. Multiple copies of the Controller Blocks 54 are necessary to ensure constant availability of the VRD RAID Controller function on the PCIe bus 82 for both "writes" and "reads". Implementation of the Controller 40 within an FPGA allows these additional copies to be added at minimal additional expense. Additional logic would prevent address range conflicts between Controller blocks 54.

The Address Decode and Control Unit 62 in each copy of the Controller Block 54 is connected to the PCI interface (I/F) 46 for interception of the "write" and "read" data request address. Each Controller Block 54 is coupled by its output, to the Write Data Multiplexer 56.

The ECC (Error Correction Code) generator 50 is coupled between the Controller Blocks 54 (through the Write Data Multiplexer 56 and the Memory Interface 48. The ECC (Error Checking and Correction) checker 52 is coupled between the Memory Interface 48 and the PCIe interface 46. Both the ECC generator and ECC checker are configured to protect data migrating through by checking for errors and, when necessary, correcting "on the fly".

The ECC principles are known to those skilled in the art, and are not detailed herein. The ECC procedure increases the reliability of the subject storage system without substantial extra cost. As an example, Reed-Solomon Codes may be implemented which are able to detect and restore "erased" bits, as well as incorrect bits.

The Write Data Multiplexer 56 facilitates data migration between the plurality of the Controller Blocks 54 and the Memory Unit 60 by coordinating parallel reading, writing and processing data in different controller blocks 54.

Advantageously, the present system 30 transfers the computational aspect of the data storage out of the centralized CPU design into the local External Memory 60, and thus reduces the centralized CPU (or GPU) memory accessing, thereby avoiding the bottleneck associated with various compute operations as opposed to being performed by means of a conventional centralized CPU (or GPU).

The Compute Engine 42 embedded in the VRD RAID controller 40 is configured to perform a wide variety of RAID coding operations for the incoming data 64 being written. The logical operations are contemplated to be entirely autonomic, i.e., the compute operations are supported at the VRD RAID controller 40 without using buffering in a centralized CPU (or GPU).

As presented in FIGS. 2A-2B and 4A-4C, each Controller Block 54 is configured with at least two Buffers 66, 68. The Compute Engine 42 in the subject VRD RAID controller 40, among numerous functions, is configured to apply RAID coding compute operations to the data written at least in one of the Buffers 66 and 68.

The compute operations in the present system 30 are automatically performed by the VRD RAID controller 40 based upon the request 69, and specifically, the PCIe address 70 (shown in FIGS. 2A-2B and 3) incoming from the host(s) 32 and associated with the required RAID coding operation.

In the VRD RAID controller 40, the external Memory Unit 60 is addressable via the PCIe interface 46 for expedited data access. The controller 40 can perform conventional "writes" and "reads" of the external memory unit 60 through the Memory Interface 48.

Figure 3:
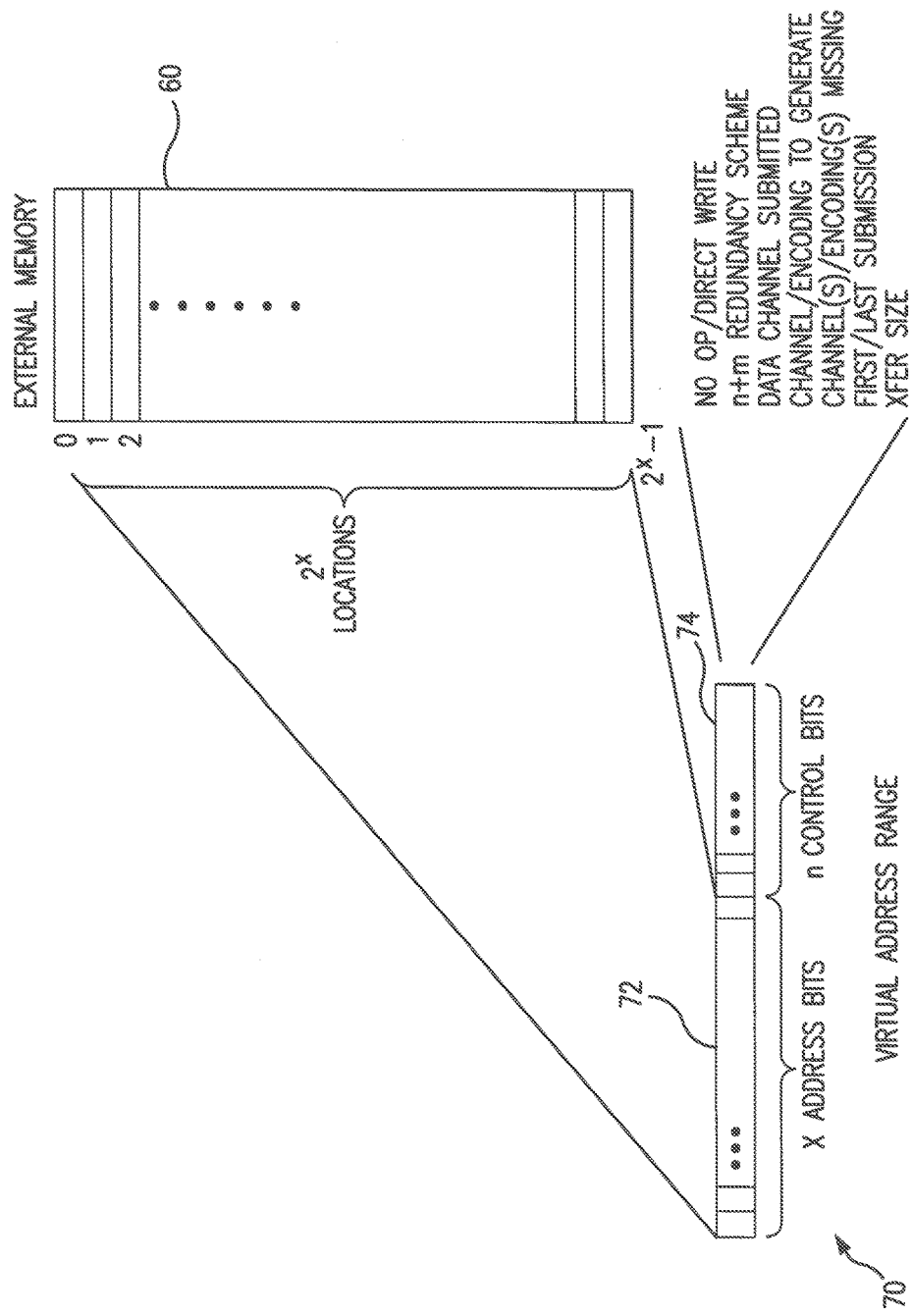
FIG. 3 is a schematic representation of the PCIe address format adapted for the operation of the subject VRD RAID controller.

The VRD RAID controller 40 automatically decodes the PCIe address 70 received from the hosts 32. As shown in FIGS. 2A-2B and 3, the request 69 includes data objects 64 (in the data field) and the PCIe address 70, which, in its turn, includes a Physical Address field 72 and a Control bits field 74. The PCIe address 70 also may contain an unused field 76 for extraneous purposes. The summation of two bit fields, i.e. the Physical Address bit field 72 and the Control bits field 74, is presented to the PCIe switch bus 38 in a format of a virtual address range.

When receiving the PCIe address 70 from the host(s) 32 through the PCIe switch bus 38 and the PCIe Interface 46, the VRD RAID controller 40 (and particularly, the Address Decode and Control Block 62) automatically decodes the Physical Address field 72 corresponding to the data address in the External Memory Unit 60, and decodes the Control bits field 74 which defines, for example, which of a plurality of pre-programmed redundancy coding schemes is to be applied to the incoming data 64.

Based upon the decoded contents of the Control bits field 74, the VRD RAID memory controller 40 commands the Compute Engine 42 to perform a required redundancy coding operation on the incoming PCIe data 64. The coding may also involve the data 78 retrieved from the external Memory Unit 60 (if needed) at the address specified in the PCIe "write" request.

The Address Decode and Control Block 62 residing within each Controller Block 54, as one of its functions, determines both the physical memory address (found in the Physical Address field 72) and a desired type of the RAID coding scheme (found in the Control bits field 74), by decoding the incoming PCIe address 70.

As shown in the FIG. 3, the attached external Memory Unit 60 with $2^x$ address locations requires "x" address bits in the Physical Address field 72 of the PCIe address 70 to access the entire Memory 60. Additional "y" control bits in the Control bits field 74 are required for decoding the desired computation associated with the RAID operation to be performed. The control bits 74 may also identify other operations or parameters required by the request in the present system. For example, these operations may include, but not limited to, "No Operation/Direct Write", "n+m redundancy scheme", "channel data submitted", "channel or coding to be generated", "channel(s) missing for error correction", "first/last submission", "data object size", etc.

The number of control bits in the control bits field 74 of the PCIe address 70 required for identification of the RAID operation requested by the hosts(s) depends upon the collection of pre-programmed operations in the system.

A logical (virtual) address is the address at which an item (memory cell, storage element, network host) appears to reside from the perspective of an executing application program. The logical address can indicate a memory location of the data but is not directly associated with it. The VRD RAID controller 40 generates the logical address.

A logical address may be different than the physical address. The Address Decode and Control Block 62 is configured also to provide the function of virtual memory mapping to the physical memory, i.e., the address translation between logical address and the physical address.

The physical address of the Memory unit 60 may be mapped to different logical addresses for various purposes. In the subject system, the same physical memory address may appear at two or more different logical addresses, for example, for different types of operations, thus attaining the logical memory that is multiple times the size of the physical memory.

The Address Decode and Control Unit 62 in the VRD RAID controller 40 is configured to execute the mapping procedure between the virtual memory and the physical memory in the subject system in a manner that presents a memory address range on the PCIe bus 82 two or more times the actual size of the attached external memory 60.

The mapping between the virtual memory (not shown) and the external Memory Unit 60 allows the external Memory Unit 60 to be mapped as a device that is 2× its actual size. If, for example, two competing compute operations are to be performed with respect to data having the same physical address in the Memory Unit 60, each of the operations may be mapped to a corresponding half of the virtual memory.

The subject controller is configured to present any number of logical address ranges in the virtual memory, wherein each logical address range performs a different redundancy coding scheme on the data.

In one of alternative arrangements of the mapping scheme employed in the subject system, the VRD RAID controller 40 can map the physical Memory 60 to two virtual address ranges (0 and 1), to facilitate sharing of the physical memory between competing processes as they require. For example, a "Write" to each virtual memory address range may be mapped to the same underlying physical address range, but the memory controller logically "separates" the requested processes.

The VRD RAID Controller is configured to perform recursive XOR based calculations for each m encoding in hardware. These operations are performed "on-the-fly" on incoming data with no added time for "write" operations.

Error checking during "read" operations occur in a similar fashion, as does the error detection, and recovery.

The subject VRD RAID controller 40 may be integrated within an FPGA (Field Programmable Gate Array), leveraging their logic density, flexibility, and cost effectiveness. FPGA technology allows the implementation of all encoding and recovery equations to match the appropriate information dispersal matrix for any pre-determined Reed-Solomon redundancy scheme coding.

The FPGA in the subject system is configured to implement a number of encoding and recovery equations utilizing Galois Multiplication Lookup tables and XOR logic incorporated in the Compute Engine 42. This function is integrated in the FPGA with the PCIe interface 46 and the Memory Interface 48. The Memory Interface 48 allows the controller 40 to locally store calculated data or encodings prior to commitment to the disks 36 or hosts 32.

Various RAID schemes are contemplated for implementation in the subject controller 40. As one of the examples, the subject system case utilizes Reed-Solomon encoding. The flexible nature of the FPGA, allows the Compute Engine 42 to be pre-programmed with appropriate equations for RAID encoding, error detection, and error correction across a wide variety of n+m combinations.

A desired n+m RAID scheme can be selected on-the-fly from a set of pre-programmed equations 116 (included in the Compute Engine 42) based on the in-band parameters (i.e., control bits in the Control bits field 74) tied to the request 69 from the hosts 32.

The equations 116 are initially created by generating an (n+m)×n Vandermonde matrix for a desired n+m scheme. Through use of the Vandermonde matrix transformations and multiplication over Galois Fields, an appropriate information dispersal matrix can be created. Based on the information determined by the dispersal matrix, all necessary RAID equations 116 can be generated for programming and are embedded into the FPGA.

Any addition or subtraction in the equations 116 would be performed by simple XOR operations achieved at negligible cost and time within the FPGA. Multiplication and division in the equations 116 are slightly more involved, but also can be achieved through multiplication over Galois Fields ($2^w$). By keeping the finite size "w" below a predetermined value, the multiplication remains fairly simple with the restriction for n+m<2w.

The Galois Multiply LUT is a look-up table that would be predetermined for the finite size "w" chosen for the implementation. As an example, but not to restrict the scope of protection, the finite size can be 4. However, the finite size "w" would also be larger as n+m≤$2^w$. In the example, for w=4, the Galois Multiply LUT would be a 16×16 array filled with values for all possible results when multiplying the two input fields with the 16 value range of 0x0 through 0xF. This allows for almost instantaneous multiplication of the two input values.

For a given finite size "w", a Galois Multiplication Look Up-Table (LUT) 92 is created. By using the equation $$x*y = gfi\ log\ [gf\ log\ [x] + gf\ log\ [y]]  \quad \text{(Eq. 1)}$$

and an appropriate logarithmic table for Galois Fields ($2^w$), the Look Up-Table 92 (LUT) can be completed for every possible multiplication combination covering the redundancy protection scheme. The requisite look up table for the given finite size "w" is then programmed into the FPGA as well.

The Eq. (1) represents multiplication over Galois Fields make no claim. This Equation is used to derive the Galois Multiply LUT 92 for fast "multiplication" in the FPGA. In this case, x and y would represent the two inputs to the LUT 92, i.e., the input data and the constant from the Channel Equation Selection block, gfi log [i] represents the inverse logarithm of I in the Galois field;

gf log [i] represents the logarithm of i in the Galois field. Table 1 in "J. S. Plank," Note: Correction to the 1997 Tutorial on Reed-Solomon Coding", Technique Report UT-CS-03-504, Dept. of Computer Science, Univ. of Tennessee, Apr. 14, 2003, 4 may be referred to as depicting the logarithmic values for a finite size "w"=4.

The present configuration permits selecting parity on a write-by-write basis. Also, by positioning the Galois Field LUT 92 in the Controller 40, the present system can attain basically unlimited scalability, with ability to grow to meet changing needs for increased capability. Also, in the event of a controller failure, the inexpensive nature of the VRD RAID controller allows numerous instances to be distributed in the network to sustain operation in the event of a hardware failure.

This approach allows the VRD RAID Controller 40 to quickly and inexpensively perform every necessary RAID calculation using simple XOR and Look Up Table 92 operations based upon the n+m RAID redundancy scheme desired.

When the subject VRD RAID controller 40 is used in conjunction with the broadcast capabilities of PCIe switches 38, transparent RAID computations upon data are attained as data flows in and out of the data storage 34. This allows RAID computations of variable redundancy to be removed from the potential bottleneck of a conventional centralized CPU.

In operation, upon receipt of the request 69 from a host 32, the Address Decode and Control Unit 62 residing at each Controller Block 54 uses the n control bits 74 found in the PCIe address 70 of the request 69 received from the PCIe Interface 46, to determine what type of n+m redundancy scheme, or other desired RAID operation, is to be performed. Subsequently, the Address Decode and Control Unit 62 generates a control signal 84 that indicates the desired RAID related operation to be performed. The control signal 84 is transmitted for the Address Decode and Control Unit 62 to the Compute Engine 42. Depending on the type of the RAID operation requested, the VRD RAID controller 40 performs the mapping between the virtual and physical memories.

Figure 4A:
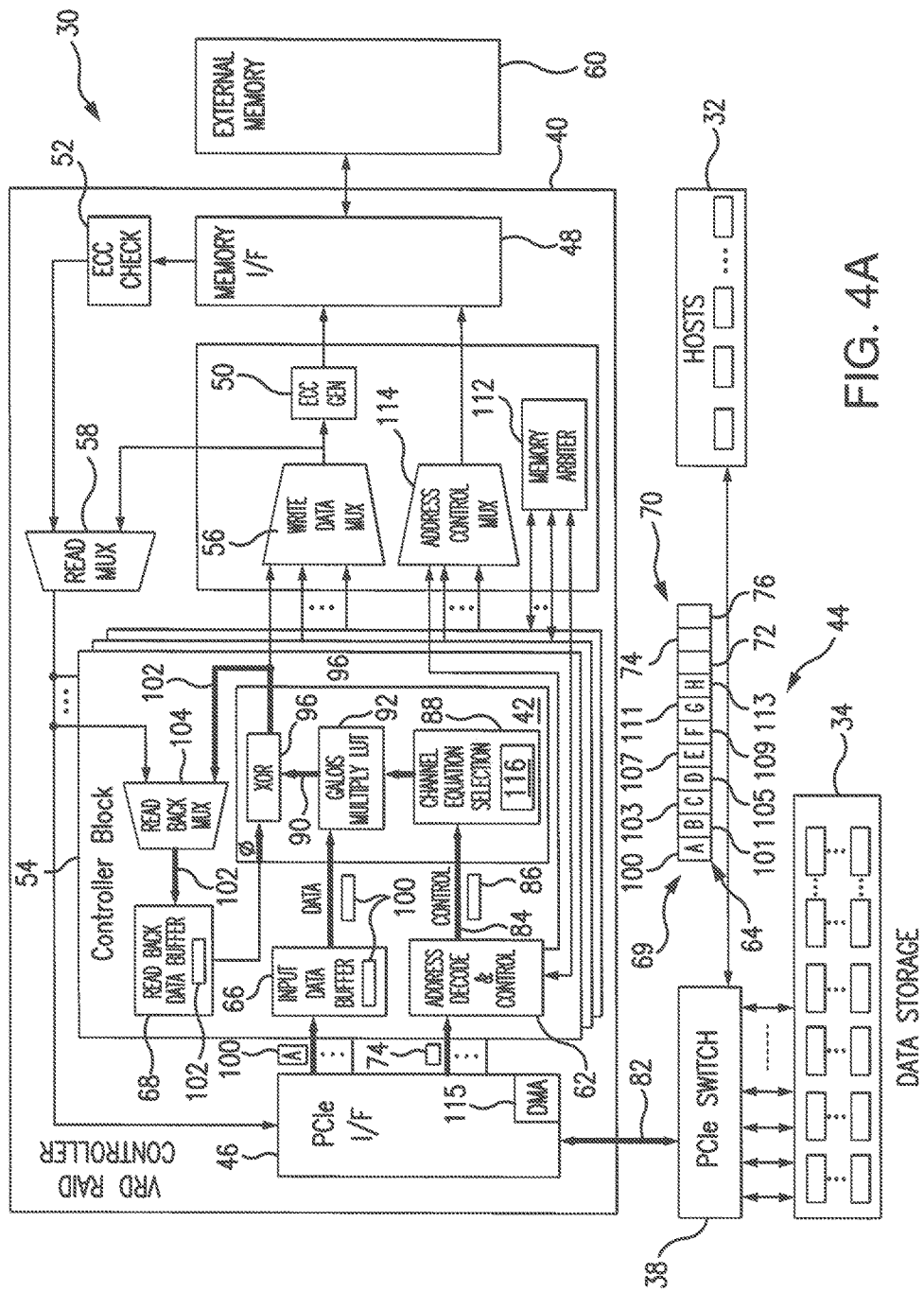
FIG. 4A is a schematic representation of the subject data storage system showing the flow of data during servicing a first data in the "write" request.

A host 32 issues a "write" request 69 including data blocks 100, 101, 103, 105, 107, 109, 111, and 113, as shown in FIGS. 2A-4A (also identified as data blocks A, B, C, D, E, F, G, and H in FIG. 4A). The hosts 32 may request to "write" the first block 100 of the data 64 of the "write" request using for example, the Address Range 0 in the Memory Unit 60, and subsequent data blocks 101-113 using the Address Range 1 in the Memory Unit 60.

As part of the RAID calculations in the Compute Engine 42, parity values are calculated for the ingress data 100-113. The RAID unit allocates space in the data storage devices 34 for the data (D) and the parity values (P).

In order to use the subject system for parity generation for the data objects 100-113 through the XOR computations, the PCIe switch 38 may forward the "write" data 64 to the storage devices 36, and mirrors a copy of the "write" data 64 to the controller 40.

Figure 4B:
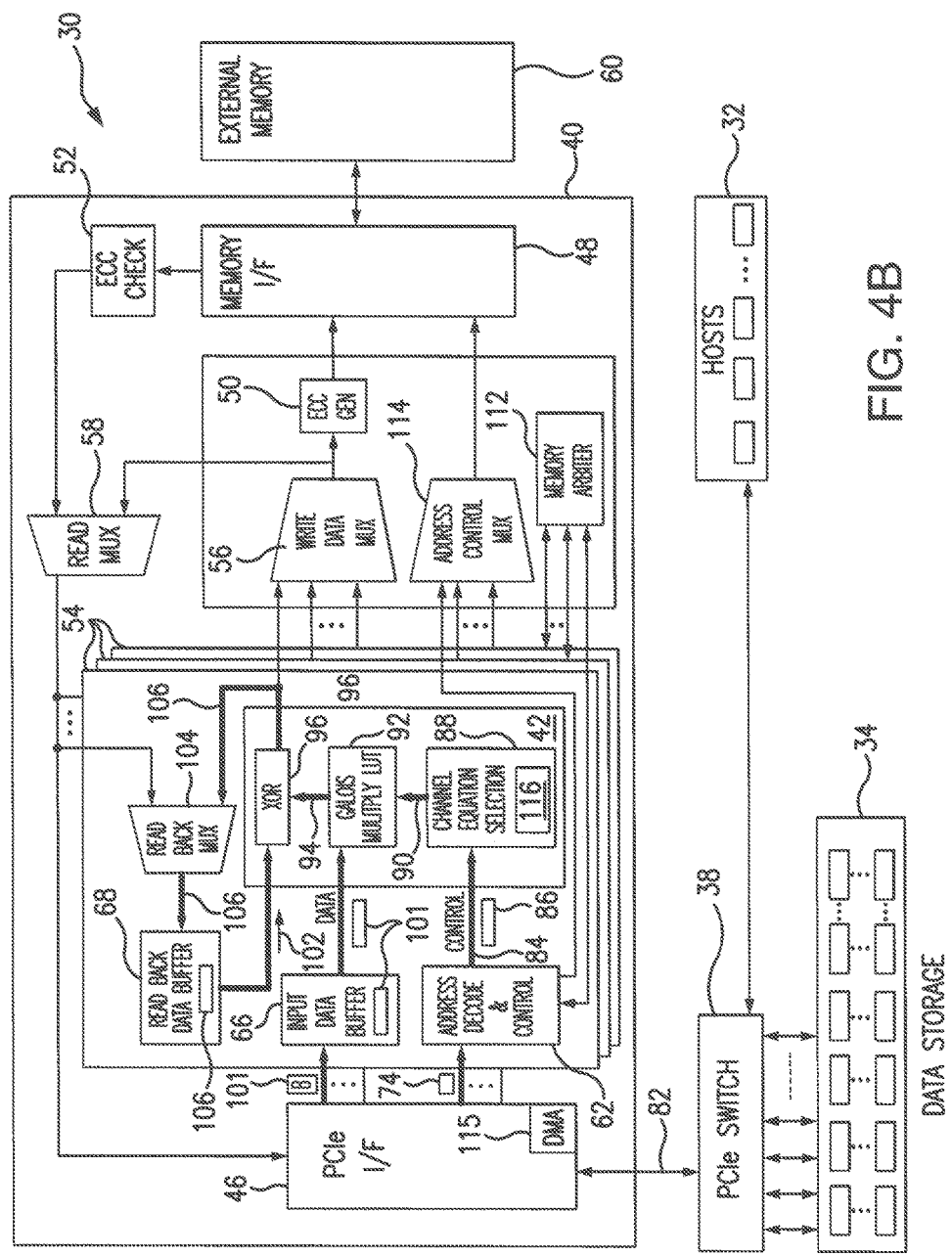
FIG. 4B is a schematic representation of the present data storage system showing the flow of data during servicing of a subsequent data in the "write" request.

As shown in FIG. 4B, the VRD RAID controller 40 receives the first data block (or object) 100 of the data 64 on a PCIe interface 46, and writes the data into the Input Buffer 66.

During the first Data block 100 write, the Read Back Data Buffer 68 feeds all ZEROs to the Compute Engine 42. Data corresponding to the Input Buffer 66 will be XOR-ed with all ZEROs, and the result 102 of the XOR-ing with zeros is committed to the Read Back Data Buffer 68.

As shown in FIG. 4B, during subsequent data block writes, for example, data block 101, the previous XOR result 102 written in the Read Back Data Buffer 68), is read from the Buffer 68 for the next XOR operation, which generates, for example, a subsequent XOR result 106. The subsequent XOR result 106 for processing the second data block 101 is written into the buffer 68.

When any subsequent data block 101-111 is buffered in the Input Buffer 66, the MUX 56 is signaled to use data from the Input Data Buffer 66 and the Read Back Data Buffer 68 to be XOR-ed using the Compute Engine 42 which is configured to perform, among other operations, the XOR calculations. For each subsequent data object 101-111, the XOR result is committed to the Read Back Data Buffer 68. This process is repeated until all data blocks 111-113 in the "write" request 69 have been processed, and a final XOR result 110 is generated.

Figure 4C:
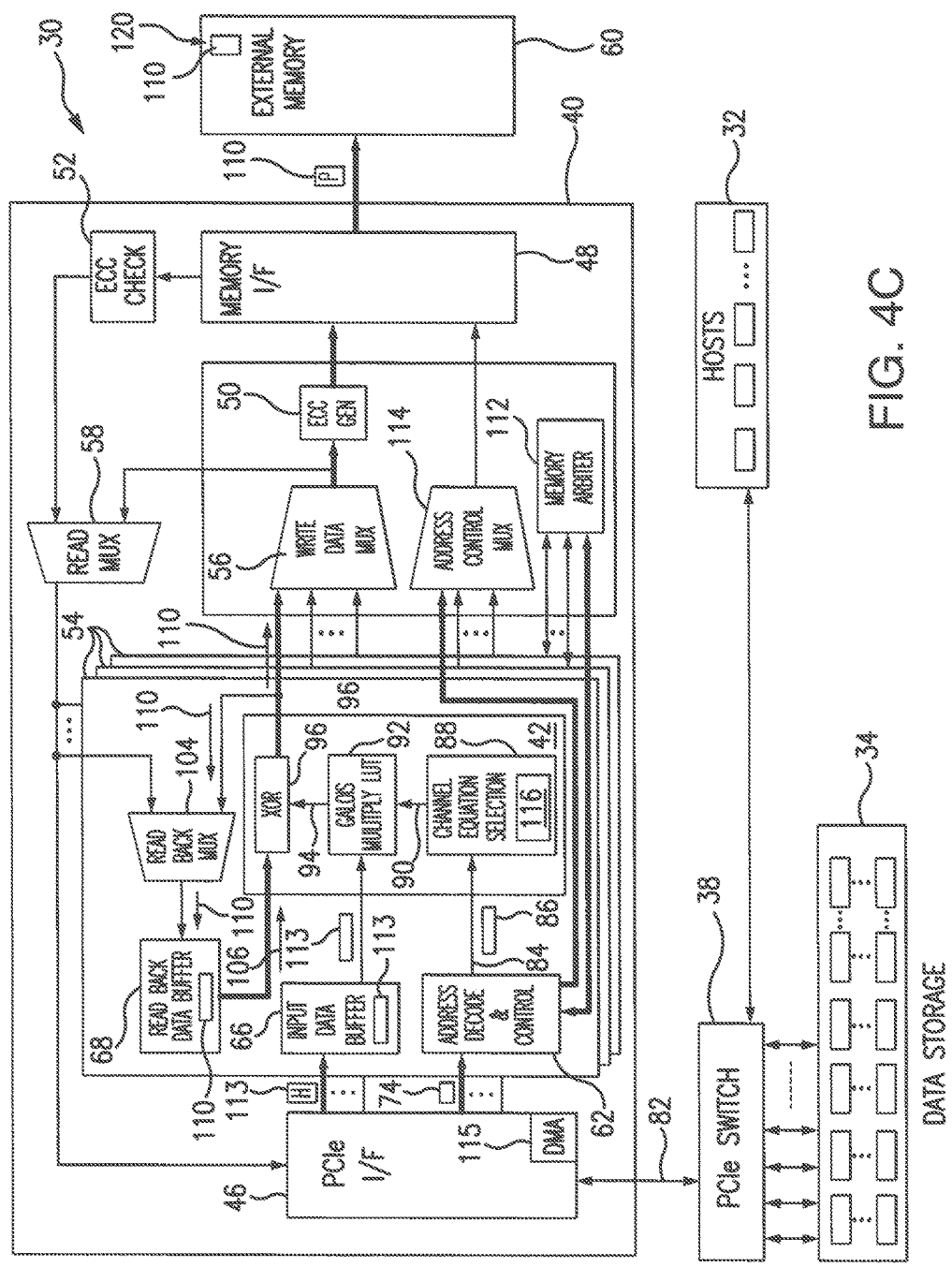
FIG. 4C is a schematic representative of the present data storage system showing the flow of data during serving the last data in the "write" request.

As shown in FIG. 4C, all of the data blocks 100-113 of the Data 64 in the request 69 have been processed in the controller 40, and the XOR parity value 110 for the entire request has been calculated and written in the Read Back Data Buffer 68. The final result 110 is committed to the Memory Unit 60, for example, at the address 120 identified at the request 69. The host 32 may send a request to the storage devices 34 to read the parity data 110 from the Memory 60.

The present structure requires the Memory Interface to only be matched to the transfer rate in comparison with 3× (+2× the parity) of the traditional RAID engine using CPU for XOR calculation.

Since RAID operations are performed recursively within the FPGA on incoming PCIe data, the memory interface transfer rate does not typically need to be faster than the PCIe transfer rate. For example, in the case of an 8+2 RAID-6 encoding calculation, there would be an 8 PCIe writes to the VRD RAID controller 40 for 2 memory accesses (1 "write" eventually followed by 1 "read") per Controller Block 54. In an 8+2 scheme, one Controller Block 54 requires the Memory Interface transfer rate to be the ¼ the PCIe transfer rate. A memory interface matched to the PCIe transfer rate could support continuous data throughput from 4 Controller Blocks 54 in this case, while keeping the PCIe interface busy.

In most cases, the number "m" of simultaneously active Controller Blocks 54 would be driven by the number of encodings $C_m$ to be calculated. Each m encoding could be calculated in parallel across m Controller Blocks 54 within the same VRD RAID controller 40 as the same data n flows in.

Put into equation form, the memory interface transfer rate requirement for sustained throughput would be:

$$\text{Memory I/F transfer rate} \geq (\text{PCIe transfer rate}) \times 2/n \times (\text{\# Controller Blocks}) \quad \text{(Eq. 2)}.$$

Since the number of active Controller Blocks 54 would optimally equal m for calculating encodings:

$$\text{Memory I/F transfer rate} \geq (\text{PCIe transfer rate}) \times 2m/n \quad \text{(Eq. 3)}.$$

For most reasonable redundancy schemes, a matched data rate would work, where n≥2m. For example, a 4+3 triple redundancy RAID scheme would require a faster memory interface, but makes little sense as the storage usage approaches a one for one mirroring.

Depending upon the location of the VRD RAID controller 40 within the storage network, it may be configured to receive data from the hosts 32, or alternatively it may be configured with a DMA (Direct Memory Access) controller 115 of the PCIe interface 46 in order to pull data from the hosts 32.

As shown in FIGS. 2A-2B, 4A-4C, and 5A-5B, during a PCIe "write", the Address Decode and Control Block 62 provides the decoded parameters 86 (with the control signal 84) acquired from the PCIe address (or virtual address range) 70 for a desired RAID operation or coding scheme to a Channel Equation Selection block 88. The Channel Equation Selection block 88 is configured to provide an appropriate multiplication constant 90 to the Galois Multiply LUT 92 for the selected n+m redundancy scheme, and the channel/encoding to be generated. Alternatively, for the error correction, in the recovery routine, the constant 90 will also reflect the channel(s)/encoding(s) missing, as will be detailed in further paragraphs.

The term "channel" is referring to a single "slice" of the data to which the redundancy is being applied. In RAID applications, a large block of data is typically broken into stripes written across the storage. For data n and redundancy m in the n+m scheme, each stripe of data would consist of n slices or channels. In the examples where n+m=8+2, there are n channels A through H.

Responsive to receipt of the information 90 from the Channel Equation Selection Unit 88, the Galois Multiply LUT 92 provides the predetermined output value 94 to the XOR block 96. The Galois M. LUT 92 processes the two input values, i.e., value 98 from the Input Data Buffer 66 and value 90 from the Channel Equation Selection block 88. The value 98 corresponds to the Data 64 acquired from the request 69 and written in the Input Data Buffer 66 upon receipt of the "write" request 69 from the host 32.

For the initial data submission in any given RAID calculation (FIG. 4A), the Address Decode and Control Block 62 will prompt the Galois Multiplication result 94 to be XOR-ed with zero data. For the PCIe write corresponding to the final data submission of a given RAID calculation (FIG. 4C), the output 110 of the controller block 54 will be committed to the external Memory Unit 60 or directly to the PCIe interface 46.

Referring to FIGS. 2A-2B and 4A, a first block 100 of data 64 (in the "write" request 69) is submitted to the Input Data Buffer 66 for a given RAID calculation. Then the XOR block 96 will Exclusive-OR all data from the Galois Multiply LUT 92 with zero. The output data (first product) 102 of the XOR block 96 will flow through the Read Back Multiplexer (Mux) 104 into the Read Back Data Buffer 68, which is matched in size to the Input Data Buffer 66. The Input Data Buffer 66 and Read Back Data Buffer 68 are matched in size to the maximum PCIe payload size for seamless calculation of a complete PCIe "write" transfer.

The output 94 of the Galois Multiply LUT block 92 will be fed to the XOR block 96 for an Exclusive-Or (XOR) operation with the previous product of XOR calculation held in the Read Back Data Buffer 68. As the previous product is emptied from the Read Back Data Buffer, the subsequent XOR result is written back into the buffer 68 in FIFO order.

Specifically, on subsequent PCIe "write" transfers (101, 103, 105, 107, 109, 113) within a given RAID calculation depicted in FIGS. 2A-2B and 4B, the XOR block 96 will perform operations between constants 94 from the Galois Multiply LUT 92 and the product 102 (corresponding to processing of the first data block 100) received at the XOR block 96 from the Read Back Data Buffer 68 thus generating a subsequent product 106. For each subsequent data block of the Data 64 in the "write" request 69, i.e., data blocks 101-113, the contents of the Read Back Data Buffer 68 are recursively overwritten during each incremental step of a given RAID calculation.

At the conclusion of a PCIe write transaction (depicted in FIG. 4C), the previous contents 106 of the buffer 68 have been recursively XOR-ed with the Galois multiplication result 94 of the incoming last PCIe "write" data 113.

The recursive nature of XOR operations allows the desired RAID calculation to be accumulated in the Read Back Data Buffer 68 as data flows across the PCIe fabric.

For the final PCIe "write", i.e., the last data block 113, for a given RAID calculation, as depicted in FIG. 4C, the XOR block 96 will perform XOR computations on the constraints 94 from the Galois Multiply LUT 92 and the preceding XOR computation product 10B (for the data block 111 in the data 64 of the "write" request 69).

A bit is provided within the virtual address range 70 to indicate the last PCIe write for a given RAID calculation. This bit is decoded by the Address Decode and Control Block 62 and provided to the Compute Engine 42 to finalize the XOR operation.

Upon producing a final XOR result 110, i.e., a parity for all data 64, for a given RAID computations, the Control Block 54 requests an access to External Memory 60 through a Memory Arbiter 112. Upon acquiring access, the data from the Read Back Data Buffer 68 is written to the designated External Memory address 120 using the Write Data Mux 56, Address/Control Mux 114, and the Memory Interface 48, and ECC Generator 50.

Data 110 can be subsequently moved from the External Memory 60 to the Data Storage 34 (or the Hosts 32) through PCIe "reads". The "read" data would flow through the Memory Interface 48, ECC Check 52, Read Mux 58, to the PCIe Interface 46. Alternatively, data could be moved to these locations by the DMA Controller 115 within the PCIe Interface 46.

Referring to FIGS. 2A-2B, 3, 4A-4C and 5A-5B, an example for an 8+2 RAID encoding scheme (where m=8, and n=2) is detailed. For n=8, m=2, both m encodings $C_1$ and $C_2$ are generated as the corresponding n=8 blocks of data (data 64 in the "write" request 69) flow across the PCIe fabric. Both encodings $C_1$ and $C_2$ (for m=2) can be calculated within two separate Controller Blocks 54 of the same VRD RAID Controller 40, or in separate VRD RAID Controllers 40. Encoding C, could be calculated from the 8 blocks A through H of data 64 (corresponding to data blocks 101, 103, 105, 107, 109, 111, and 113, respectively, as presented in FIGS. 2A-2B and 4A-4C), with the following Reed Solomon generated equation 116 (in which the symbol □ represents an XOR operation):

$$C1=(0xf)A\square(0x2)B\square(0xc)C\square(0x5)D\square(0xa)E\square(0x4)F\square(0x3)G\square(0x8)H \quad \text{(Eq. 4)}$$

For the purpose of this example, the assumption is made that the n=8 data blocks flow across the network in the sequence A through H. In the subject system, the order of "write" operation is not critical due to the recursive nature of XOR operations. The only provision to be made is that the VRD RAID Controller 40 is notified through inclusion of specific bits (for the first and the last data blocks) within the PCIe address field 70 during writing of the $1^{st}$ and $n^{th}$ blocks.

Figure 5A:
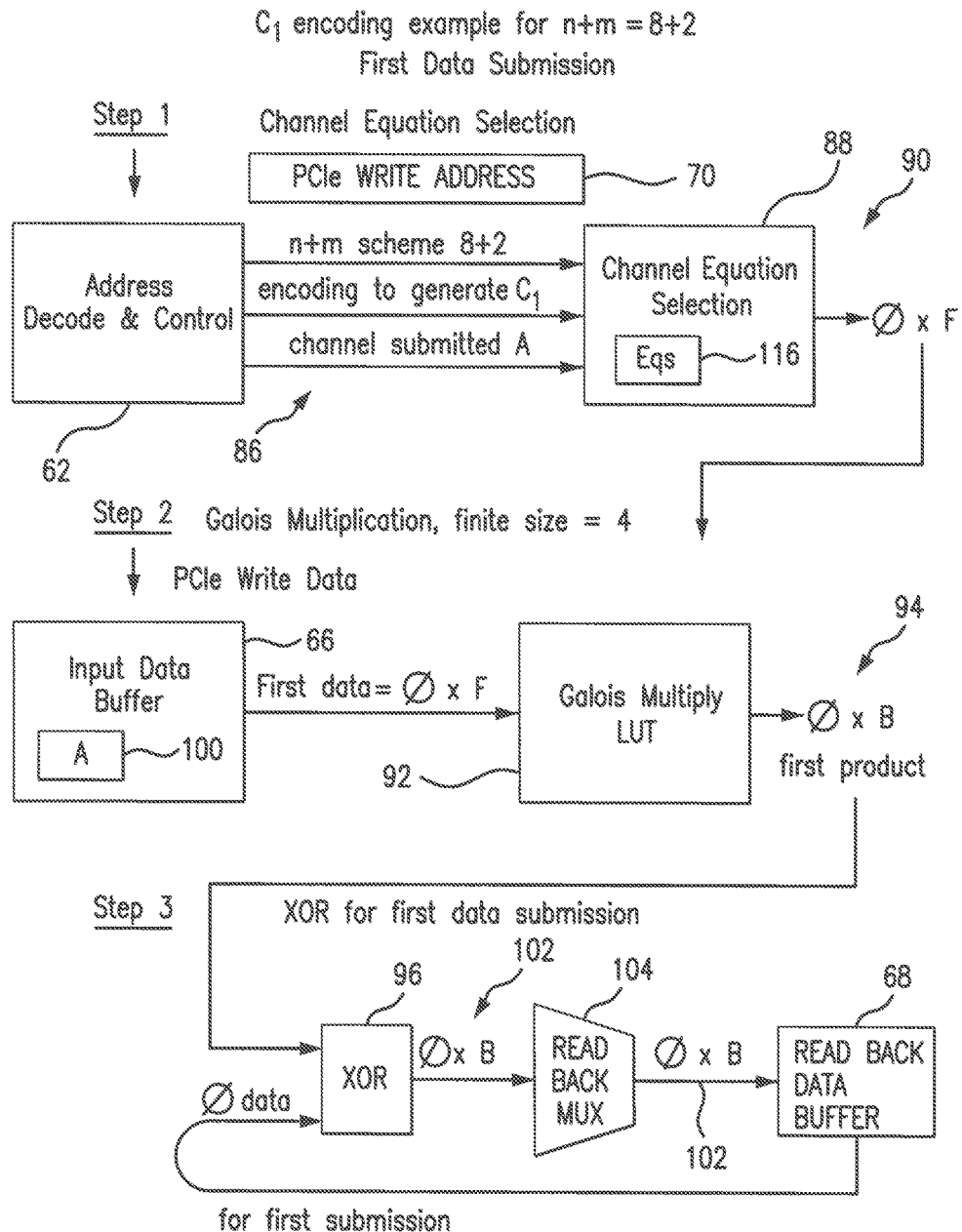
FIG. 5A is a flow-chart representative detailing the process illustrated in FIG. 4A.

As the PCIe payload corresponding to data block A (i.e., the first block of the data 64) flows across the PCIe fabric, it is broadcast to the VRD RAID Controller 40. As shown in FIG. 5A, included in the virtual address range 70 is the information specifying the n+m redundancy scheme, i.e., the (8+2) coding scheme, the encoding to be calculated ($C_1$), the channel data submitted (A), and an indication that this is the first data block submitted for this encoding.

In Step 1, depicted in FIG. 5A, the Address Decode and Control Unit 62 decodes this information, and submits the control signal 84 containing the decoded parameters 86 (n+m scheme, encoding to generate, i.e., $C_1$, and a channel submitted, i.e., A) to the Channel Equation Selection Unit 88. The Control Channel Equation Selection Unit 88 subsequent to the receipt of the decoded parameters 86, selects the constant 90 (0xf) from the $C_1$ encoding equation 116 (Eq. 4) which was pre-determined (pre-programmed) for the encoding $C_1$.

The constant (0xf) is subsequently (in Step 2) input from the Channel Equation Selection Unit 88 to the Galois Multiply LUT 92 along with the data A from the Input Data Buffer 66.

The value 0x7 depicted in FIG. 5A is arbitrarily chosen purely for the sake of example as the first value of input data from the Buffer 66. In the case of the first data block A input for a given encoding $C_1$, the output 94 of the Galois Multiply LUT (0xf)A would be XOR-ed in Step 3 with ZEROs. The result 94 produced by the XOR block 96 is fed into the Read Back Data Buffer 68.

The value 0xB is the output 94 of the Galois Multiple LUT 92 with finite size of 4 when the inputs 0x7 and 0xF are applied in Step 2. For this example, 0x7 is the input data and 0xF comes from the equation 116 for the $C_1$ encoding which is the constant by which channel or slice A is multiplied:

$$C1=(0xf)(0x2)B(0xc)C(0x5)D(0xa)E(0x4)F(0x3)G(0x8)H \quad \text{(Eq. 5)}$$

The LUT operations are replicated across the entire data field. The data field may, for example, be 64 bits wide in this implementation. The example depicted in FIGS. 5A-5B shows a 4 bit wide piece of that 64 bit word coming across the PCIe bus and ultimately the Input Data Buffer.

In the subject system 30, there are actually 16 Galois LUTs 92 connected in parallel, each simultaneously processing a 4 bit piece of the data. The outputs of the 16 LUTs 92 are appended together to form the 64 bit result.

The Galois Multiply/XOR is continued until the Input Data Buffer 66 is emptied and all channel A data is processed. Each channel (or slice of data) would correspond to an entire PCIe data transfer. The Input Data Buffer 66 is matched in size to the maximum PCIe payload size. Once the Input Data Buffer 66 is exhausted, all PCIe data for that channel (or slice) has been processed. The host 32 proceeds sending the remaining data until n slices have been processed for a given stripe of data.

Figure 5B:
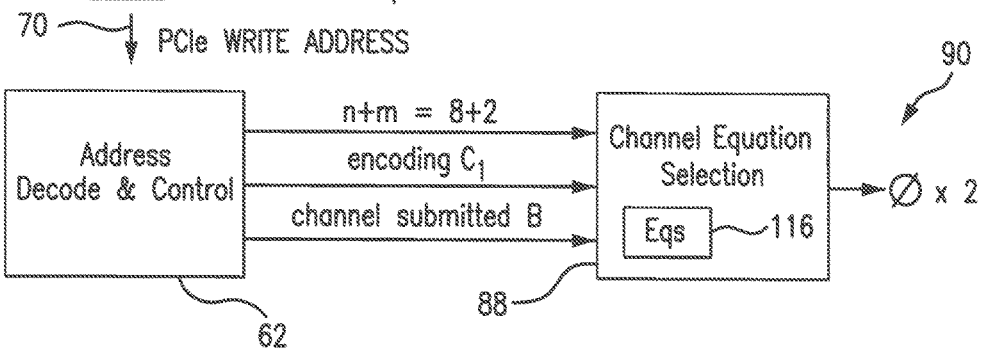
FIG. 5B is a flow-chart representative detailing the process illustrated in FIGS. 4B and 4C.
Figure 5B:
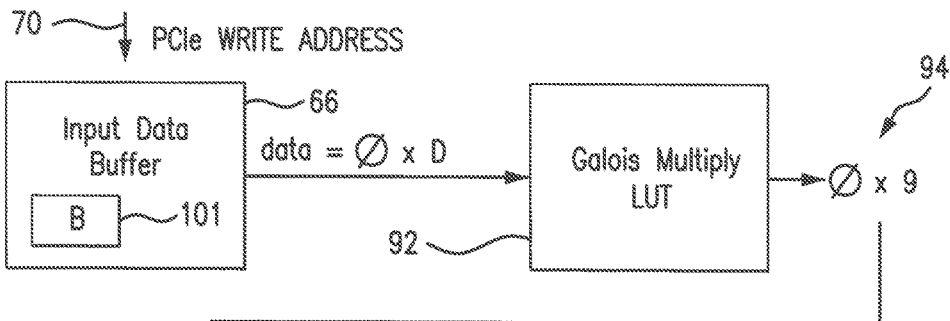
Figure 5B:
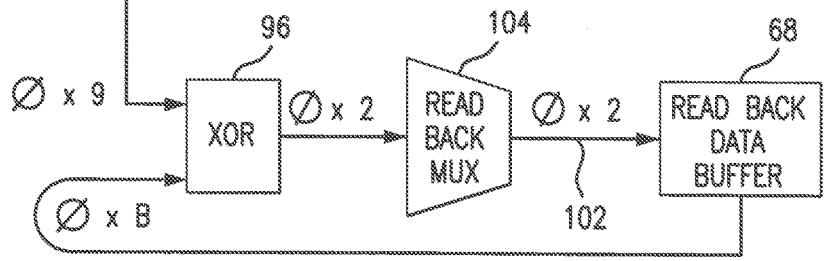

Referring to FIG. 5B, detailing the processing for the subsequent data, for example, data B, with the product (0xf)A residing in the Read Back Data Buffer 68, in Step 4, the channel data B is captured in the Input Data Buffer 66 as it flows across the PCIe fabric.

From the parameters decoded from the virtual address range, the constant 0x2 (from Eq. 5) is fed in Step 5 to the Galois Multiply LUT 92 along with data B from the Input Data Buffer 66. In Step 5, data 0xD is being submitted for channel (or slice) B. The Channel Equation Selection Unit 88 provides the constant 0x2 from the following example equation for n+m=8+2.

$$C1=(0xf)A(0x2)B(0xc)C(0x5)D(0xa)E(0x4)F(0x3)G(0x8)H \quad \text{(Eq. 6)}$$

Constant 0x2 and input data 0xD are applied to the LUT 92 which then outputs the product 0x9.

The product 0x9 is the predetermined value from the Galois Multiple LUT calculated for a finite size w=4. This is a 4 bit wide piece of the first incoming 64-bit data for channel/slice B.

In this case, in Step 6, the XOR block 96 performs operations between the data 106 (0xb) written in the Read Back Data Buffer and the output 94 (0x9) of the Galois Multiply LUT 92 for the subsequent data block B. This result 106 is written back into the Read Back Data Buffer 68 in FIFO order until the Input Data Buffer 66 is exhausted. At this point, the Read Back Data Buffer 66 contains the intermediate result of XORing operation, i.e.; (0xf)A □ (0x2)B.

In the following Step 7, Steps 4-6 would be continued recursively until the entire encoding $C_1$ for all data A-H resides in the Read Back Data Buffer 68, i.e., until all channels needed for the entire encoding have been processed. At that point, entire C, encoding 110 resides in the Read Back Data Buffer 68.

Subsequently, with the indication from the PCIe address field that the last data block H has been written, the encoding $C_1$ would be committed to External Memory at the address 120 (shown in FIGS. 2A and 4C) decoded from the PCIe address 70. The Controller Block 40 moves the data to the external Memory Unit (as detailed in FIG. 4C) when granted access by the Memory Arbiter 112.

Once resident in External Memory 60, the coding $C_1$ would be transferred to data storage 34 by DMA 115 or through direct PCIe read of the external memory 60.

By performing intermediate calculations within the FPGA, the bandwidth requirements for the external Memory Interface are greatly reduced. This allows for a lower cost FPGA and the memory device. Multiple Controller Blocks within each VRD RAID Controller can also perform operations simultaneously while sharing the external memory through the Memory Arbiter. The process, as described in previous paragraphs, would apply to all possible n+m RAID redundancy schemes.

Figure 6:
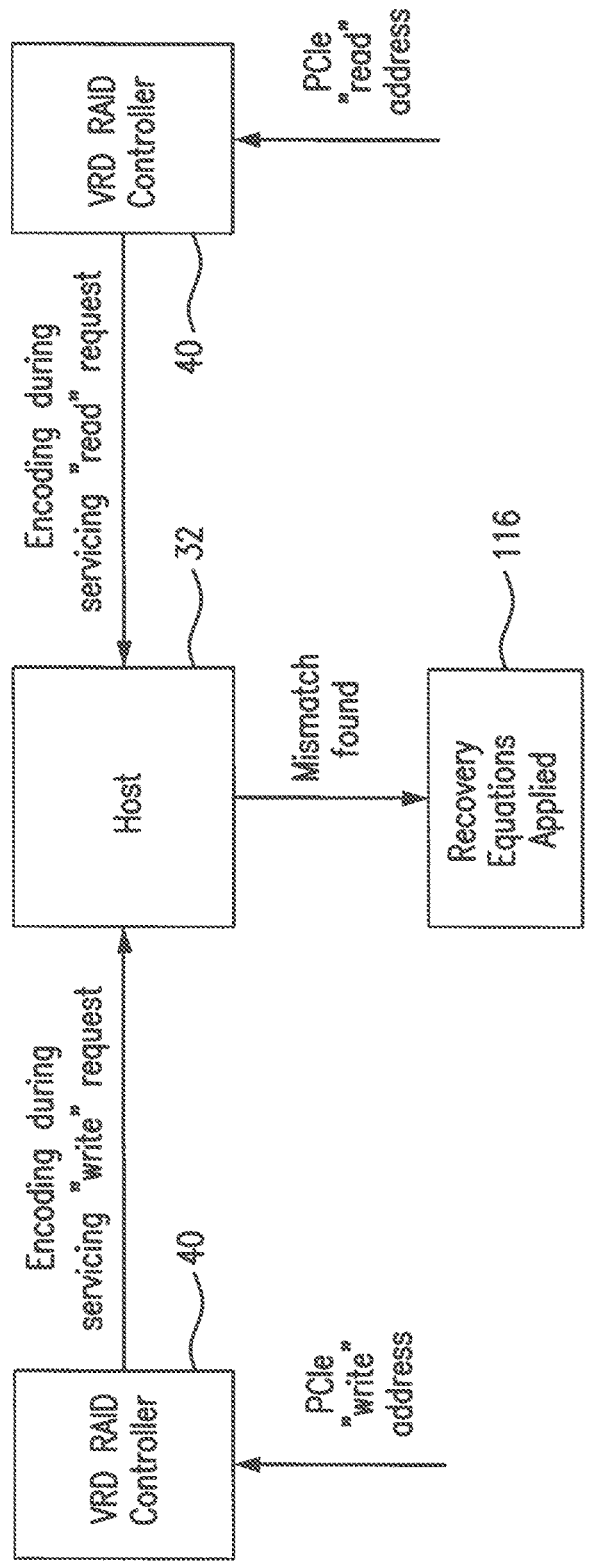
FIG. 6 is a simplified schematic representation of the process for error detection during servicing "read" requests.

The process for error detection would be nearly identical to that described above for generation of RAID encoding. In this case, the encodings $C_1$ through $C_m$ would be generated as the data flows across the PCIe fabric from the Data Storage 34 to the Hosts 32. As presented in FIG. 6, the encodings generated during the "read" from Data Storage 34 would be compared by the Host 32 to those previously committed to Data Storage during servicing the "write". In the event of a mismatch of a given encoding between writing and reading Data Storage, an error is detected by the Host. Upon detection of an error, the Host would use the recovery equations 116 pre-programmed in the VRD RAID Controllers 40 to isolate the failed channel(s) and/or encoding(s).

Each channel and encoding would have a set of predetermined recovery equations 116 pre-programmed into the FPGA, each with a total of n Galois multiplication terms. For a given channel or encoding, each recovery equation would exclude (m−1) channels or encodings.

In the exemplary case of 8+2 RAID encoding, the recovery equations 116 for channel A with all possible missing terms could be:

$$A = (0x6)C \square (0x4)D \square (0xc)E \square (0x1)F \square (0x3)G \square (0x9)$$
$$H \square (0x2)C1 \square (0x6)C2 \ (B \text{ missing}) \quad \text{(Eq. 7)}$$

$$A = (0x8)B \square (0x1)D \square (0x4)E \square (0xb)F \square (0x7)G \square (0x2)$$
$$H \square (0x7)C1(0x5)C2 \ (C \text{ missing}) \quad \text{(Eq. 8)}$$

$$A = (0xf)B \square (0xf)C \square (0x3)E \square (0x9)F \square (0xd)G \square (0xb)$$
$$H \square (0x6)C1 \square (0xb)C2 \ (D \text{ missing}) \quad \text{(Eq. 9)}$$

$$A = (0xc)B \square (0x3)C \square (0xa)D \square (0xe)F \square (0x5)G \square (0xe)$$
$$H \square (0xc)C1 \square (0xd)C2 \ (E \text{ missing}) \quad \text{(Eq. 10)}$$

$$A = (0xa)B \square (0x8)C \square (0xd)D \square (0x6)E \square (0x6)G \square (0x4)$$
$$H \square (0xb)C1 \square (0x1)C2 \ (F \text{ missing}) \quad \text{(Eq. 11)}$$

$$A = (0x6)B \square (0xd)C \square (0x3)D \square (0xa)E \square (0xf)F \square (0x3)$$
$$H \square (0x5)C1 \square (0xa)C2 \ (G \text{ missing}) \quad \text{(Eq. 12)}$$

$$A = (0x7)B \square (0x9)C \square (0x5)D \square (0xb)E \square (0x3)F \square (0x9)$$
$$G \square (0x3)C1 \square (0x8)C2 \ (H \text{ missing}) \quad \text{(Eq. 13)}$$

$$A = (0xe)B \square (0xb)C \ D(0x6)D \square (0x2)E \square (0x5)F \square (0x4)$$
$$G \square (0x8)H \square (0x9)C2 \ (C1 \text{ missing}) \quad \text{(Eq. 14)}$$

$$A = (0x3)B \square (0xa)C \square (0xe)D \square (0xf)E \square (0x6)F \square (0xb)$$
$$G \square (0xc)H \square (0x8)C1 \ (C2 \text{ missing}) \quad \text{(Eq. 15)}$$

Similar equations exist for recovery of data channels B through H along with $C_1$ and $C_2$.

To isolate the failed channel(s) and/or encoding(s) in this case, the Host could simultaneously utilize multiple controller blocks to perform the recovery equations for each channel and encoding. In the case of a failed channel(s) or encoding(s), none of the recovery equations will generate a result matching that read from Data Storage. For the channel(s) or encoding(s) not failed, only equations excluding the failed channel(s) or encoding(s) will generate results matching that read from Data Storage.

Once the failed channel(s) or encoding(s) is determined, the Host uses the appropriate recovery equations to recreate the missing data. Since the data regeneration can occur simultaneously across multiple VRD RAID Controllers, the rebuild can be performed more quickly than with a conventional central CPU.

The external Memory Interface 48 is designed to transfer data at exactly the PCIe data transfer rate. Recursive calculations within the FPGA allow the compute operation to be performed with minimal access to the Memory Unit 60. This alleviates the need for a faster and costly external memory configuration, while maintaining transparency with no penalty or overhead in the system transfer time. As data flows to and from the external Memory Unit 60, the ECC generator 52 and checker 52 protects it. The availability of a plurality of the Controller Blocks 54 permits the controller 40 to handle multiple PCIe operations simultaneously through the Write multiplexer 56.

The Memory Interface 48 between the Controller Blocks 54 and the external Memory Unit 60 is required to match the transfer rate of the PCIe switch 38 to maintain the data transfer at full speed. To allow constant data activities on the PCIe switch bus 38, the multiple copies of the Controller Block 54 cooperate each with the other. While one copy of the Controller Block 54 may read data from the external Memory Unit 60 to the Read Back Data Buffer, another copy of the Controller Block 54 may be receiving the incoming data from the PCIe switch 38 to the Input Buffer 66. The number of the Controller Blocks 54 necessary for stable and effective data migration and processing depends upon the data transfer rates of the PCIe bus 82 and the Memory Interface 48 for a particular application.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements may be reversed or interposed, all without departing from the spirit or scope of the invention as defined in the appended claims.

What is being claimed is:

1. A data storage system, comprising:
a Variable Redundancy Distributed (VRD) RAID controller operatively coupled to at least one data generating entity and a data storage, said at least one data generating entity being further operatively coupled to said data storage, said VRD RAID controller having a plurality of Controller Blocks embedded therein, and
an external Memory Unit operatively coupled to an output of each of said plurality of Controller Blocks;
wherein each said Controller Block includes:
a first Buffer,
a second Buffer,
a Compute Engine having first and second inputs respectively coupled to outputs of said first and second Buffers, said Compute Engine being pre-configured to perform any of a plurality of predetermined RAID operations on data written at least in one of said first and second Buffers responsive to control information, said data being simultaneously broadcast to said VRD RAID controller as said data is transferred to or from said data storage, and an Address Decode and Control Unit residing in at least one Controller Block and operatively coupled to a third input of said Compute Engine;

wherein said VRD RAID controller is configured to receive at least one request from said at least one data generating entity, said at least one request including a data field containing at least one data object, and an address request associated therewith, wherein said address request includes an Address bits field corresponding to an address for said at least one data object in said external Memory Unit, and a Control bits field identifying at least one of said plurality of predetermined RAID operations, wherein said at least one predetermined RAID operation includes a computation of an n+m redundancy coding scheme identified by said at least one data generating entity, wherein n is a variable identifying a number of said at least one data objects in said data field, and m is a variable identifying a number of error correction coding objects of interest, wherein said Compute Engine is configured with a plurality of encoding and recovery equations pre-determined in said Compute Engine, and wherein said Address Decode and Control Unit is configured, upon receipt of said address request, to decode said control information contained in said Control bits field of said address request and prompt said Compute Engine to compute m encodings $C_m$, each encoding in accordance with a respective encoding equation selected by said Compute Engine from said plurality thereof in accordance with said decoded information.

2. The data storage system of claim 1, wherein each of said m encodings $C_m$ is computed in any of said plurality of Controller Blocks.

3. The data storage system of claim 1, wherein said Compute Engine includes a Channel Equation Selection Unit coupled, by an input thereof, to said Address Decode and Control Unit to receive said control information therefrom, and wherein said Channel Equation Selection unit is configured to produce, at an output thereof, a multiplication constant corresponding to said n+m redundancy coding scheme for each of said m encodings $C_m$ responsive to said control information.

4. The data storage system of claim 3, wherein said Compute Engine further includes a Galois Multiplication Look-Up-Table (LUT) coupled, by an input thereof, to said output of said Channel Equation Selection Unit to receive therefrom said multiplication constant, and by another input to said first Buffer, to receive therefrom said at least one data object written therein, wherein said Galois Multiplication LUT is configured to generate a respective at least one product based on said multiplication constant and said at least one data object.

5. The data storage system of claim 4, wherein said Compute Engine further includes an XOR (Exclusive-OR) Engine coupled, by one input thereof, to an output of said Galois Multiplication LUT, and, by another input thereof, to an output of said second Buffer, wherein said XOR Engine is configured to generate an XOR result based on said respective at least one product received from said Galois Multiplication LUT and a data received from said second Buffer.

6. The data storage system of claim 5, wherein said at least one request is a "write" request containing an incoming data, and wherein said VRD RAID controller is configured, upon receipt of said "write" request, to pass a first data object contained in said data field into said first Buffer, and apply, in said XOR Engine, for said first data object, an XOR computation to said respective at least one product generated at said Galois Multiplication LUT and zero, thereby obtaining at least one XOR result for said first data object;

wherein said at least one XOR result is written to said second Buffer.

7. The data storage system of claim 6, wherein said VRD RAID controller is further configured, for each data object in said data field subsequent to said first data object and for said n+m redundancy coding scheme, to apply incrementally the XOR computation to a subsequent at least one respective product generated at said Galois Multiplication LUT for said each subsequent data object and at least one XOR result of a preceding XOR computation, thus generating a subsequent XOR result for each subsequent data object, and incrementally writing said subsequent XOR results for said each subsequent data object in said second Buffer.

8. The data storage system of claim 7, wherein said VRD RAID controller is further configured to recursively overwrite the contents of said second Buffer during each incremental generation of the subsequent XOR results for all subsequent data objects found in said data field.

9. The data storage system of claim 8, wherein for a last data object in said data field, said VRD RAID controller is further configured to generate a final XOR result for the preceding respective product generated at said Galois Multiplication LUT and the preceding XOR result written in said second Buffer, thereby generating the resulting redundancy coding for said data objects in said field.

10. The data storage system of claim 9, wherein said VRD RAID controller is further configured to pass said resulting redundancy coding to said corresponding data address in said external Memory Unit.

11. The data storage system of claim 1, wherein said Control Bits field includes information indicative of at least one logical operation selected from Direct Write, n+m redundancy coding scheme, data channel submitted, channel/encoding to generate, channel/encoding missing, first/last submission, size of at least one data object, and combinations thereof.

12. The data storage system of claim 10, wherein said request is a "read" request, and wherein said VRD RAID controller is further configured, upon receipt of said "read" request, to read a requested at least one data object from said data storage and pass said data object into said first Buffer, wherein said Compute Engine is configured to apply said encoding $C_m$ corresponding to said n+m coding scheme to said at least one data object written in said first Buffer, thereby obtaining a computational result and pass said computational result towards said at least one data generating entity; and wherein said at least one data generating entity is configured to compare said encoding generated during servicing the "read" request to said encoding $C_m$ generated during servicing the "write" request, and if a mismatch is found, to apply said recovery equations pre-programmed within said Compute Engine of said VRD RAID controller to isolate a failed channel or encoding.

13. The data storage system of claim 9, further including:
at least one PCIe switch coupled between said at least one data generating entity and said data storage, and configured to transmit said at least one request to said VRD RAID controller, and
a PCIe Interface Unit operatively coupled between said at least one PCIe switch and said each Controller Block.

14. The data storage system of claim 13, further including a Memory Interface operatively coupled between said each Controller Block and said external Memory Unit, wherein said Memory Interface is configured to transmit said resulting redundancy coding to a corresponding data address in said external Memory Unit.

15. The data storage system of claim 14, further including a first Multiplexer coupled between said plurality of Controller Blocks and said external Memory Unit, and configured to transmit said resulting redundancy coding to said external Memory Unit through said first Multiplexer in a coordinated fashion.

16. The data storage system of claim 15, further including a second Multiplexer coupled between outputs of said first Multiplexer, said external Memory Unit, and a PCIe Interface operatively coupled to said at least one PCIe switch.

17. The data storage system of claim 16, further including:
an ECC (Error Checking and Correction Code) generator unit operatively coupled between said first Multiplexer and said external Memory Unit for protecting said resulting redundancy coding transferred to said external Memory Unit from errors by applying said ECC procedure thereto, and
an ECC (Error Checking and Correction) checking unit operatively coupled between said external Memory Unit and said data storage for protecting results of the requested RAID operation transferred from said external Memory Unit to said data storage from errors by applying said ECC procedure thereto.

18. The data storage system of claim 13, wherein said data storage includes a storage array coupled to said PCIe switch, where said storage array includes storage devices selected from a group consisting of: disk drives, solid-state memory devices, and combination thereof, and
wherein said VRD RAID controller is integrated with each of storage devices in said storage array.

19. A method for data migrating in a data storage system, comprising the steps of:
(a) coupling at least one data generating entity to a data storage;
(b) coupling a Variable Redundancy Distributed (VRD) RAID controller to said at least one data generating entity, said data storage and an external Memory Unit;
(c) embedding a plurality of Controller Blocks in said VRD RAID Controller, wherein each of said Controller Blocks includes a first Buffer, a second Buffer, an Address Decode and Control Unit, and a Compute Engine coupled to said first and second Buffers and said Address Decode and Control Unit;
(d) receiving a request from said at least one data generating entity, said request having data field containing at least one data object, and a requested address associated therewith, wherein said requested address includes a Physical Address field, containing identification of a corresponding address for said data object in said external Memory Unit, and a Control bits field containing information identifying at least one n+m redundancy coding scheme for said at least one data generating entity;
(e) pre-configuring said Compute Engine to compute any of a plurality of n+m redundancy coding schemes, wherein n is a variable identifying a number of data objects, and m is a variable identifying a number of error correction coding objects;
(f) pre-programming said Compute Engine with a plurality of encoding and recovery equations;
(g) placing said at least one data object in said first Buffer while said at least one data object is transferred between said at least one data generating entity and said data storage;
(h) decoding, by said Address Decode and Control Unit, said Control Bits field, generating a decoded information signal, corresponding to said requested n+m redundancy coding scheme;
(i) supplying said decoded information signal to said Compute Engine; and
(j) prompting said Compute Engine to compute m predetermined encodings $C_m$ corresponding to respective ones of said encoding equations based on said decoded information for said requested n+m redundancy coding scheme, in accordance with a respective encoding equation selected by said Compute Engine from said plurality thereof in accordance with said decoded information for said n+m redundancy coding scheme.

20. The method of claim 19, further comprising the step of computing each of said m encodings $C_m$ in at least one of said plurality of Controller Blocks.

21. The method of claim 19, further including the steps of:
embedding a Channel Equation Selection Unit into said Compute Engine,
coupling said Channel Equation Selection Unit by an input thereof, to said Address Decode and Control Unit to receive said decoded information therefrom, and
producing, in said Channel Equation Selection Unit, a multiplication constant corresponding to said n+m redundancy coding scheme for each of said m encodings $C_m$ responsive to said decoded information.

22. The method of claim 21, further comprising the steps of:
embedding a Galois Multiplication Look-Up-Table (LUT) in said Compute Engine,
supplying to said Galois Multiplication LUT said multiplication constant from said Channel Equation Selection Unit and at least one data object written in said first Buffer, and
generating in said Galois Multiplication LUT a respective at least one product based on said multiplication constant and said at least one data object.

23. The method of claim 22, further comprising the steps of:
embedding an XOR (Exclusive-OR) Engine in said Compute Engine;
coupling said XOR Engine, by one input thereof, to an output of said Galois Multiplication LUT, and, by another input thereof, to an output of said second Buffer,
generating, in said XOR Engine, an XOR result based on said respective at least one product received from said Galois Multiplication LUT and a data received from said second Buffer.

24. The method of claim 23, wherein said at least one request is a "write" request containing an incoming data, further comprising the steps of:
upon receipt of said "write" request, passing, by said VRD RAID controller, a first data object contained in said data field into said first Buffer, applying, for said first data object, in said XOR Engine, an XOR computation to said respective at least one product generated at said Galois Multiplication LUT and zero, thereby obtaining a first XOR result for said first data block; and writing said first XOR result to said second Buffer.

25. The method of claim 24, further comprising the steps of:

for each data object subsequent to said first data block and for said n+m redundancy coding scheme, applying incrementally the XOR computation to a subsequent respective product generated for said each subsequent data object at said Galois Multiplication LUT and a preceding XOR result of a preceding XOR computation, thus generating a subsequent XOR result, and incrementally writing said subsequent XOR result for each subsequent data object in said second Buffer.

26. The method of claim 25, further comprising the steps of:

recursively overwriting the contents of said second Buffer during each of incremental generation of the subsequent XOR results for all data object found in said data field.

27. The method of claim 26, further comprising the steps of:

for a last data object in said data field, generating a final XOR result for the preceding respective product generated at said Galois Multiplication LUT and the preceding XOR result written in said second Buffer, thereby generating the resulting redundancy coding for said data objects contained in said data field, and passing said resulting redundancy coding to said corresponding data address in said external Memory Unit.

28. The method of claim 27, wherein said request is a "read" request, comprising the steps of:

upon receipt of said "read" request, reading a requested data object from said data storage and passing said data object into said first Buffer, applying, in said Compute Engine, said encoding corresponding to said n+m coding scheme to said data object written in said first Buffer, thereby obtaining an XOR result, passing said XOR result towards said data generating entity, comparing, at said at least one data generating entity, said encoding generated during servicing the "read" request to said encoding $C_m$ generated during servicing the "write" request, and if a mismatch is found, applying, in the data generating entity, said recovery equations pre-programmed within said Compute Engine of said VRD RAID controller to isolate a failed channel or encoding.

29. The method of claim 27, further comprising the step of transmitting said resulting redundancy coding to said external Memory Unit through a Multiplexer coupled between said plurality of Controller Blocks and said external Memory Unit in a coordinated fashion.

* * * * *